(12) United States Patent
Doufas et al.

(10) Patent No.: US 10,590,212 B2
(45) Date of Patent: Mar. 17, 2020

(54) MULTIMODAL AND BROAD MOLECULAR WEIGHT HIGH DENSITY POLYETHYLENE

(71) Applicant: ExxonMobil Chemical Patents Inc., Baytown, TX (US)

(72) Inventors: Antonios K. Doufas, Houston, TX (US); David F. Sanders, Beaumont, TX (US); Alexander I. Norman, Houston, TX (US); Matthew W. Holtcamp, Huffman, TX (US); Keith R. Green, Onalaska, TX (US); Rohan A. Hule, Houston, TX (US); Derek W. Thurman, Friendswood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 202 days.

(21) Appl. No.: 15/564,559

(22) PCT Filed: Apr. 20, 2016

(86) PCT No.: PCT/US2016/028423
§ 371 (c)(1),
(2) Date: Oct. 5, 2017

(87) PCT Pub. No.: WO2016/172197
PCT Pub. Date: Oct. 27, 2016

(65) Prior Publication Data
US 2018/0079845 A1 Mar. 22, 2018

Related U.S. Application Data

(60) Provisional application No. 62/149,807, filed on Apr. 20, 2015.

(30) Foreign Application Priority Data

Jun. 12, 2015 (EP) ..................... 15171803
Mar. 10, 2016 (WO) ............... PCT/US2016/021757

(51) Int. Cl.
*C08F 10/02* (2006.01)
*C08F 4/659* (2006.01)
(Continued)

(52) U.S. Cl.
CPC ............ *C08F 210/16* (2013.01); *C08F 4/659* (2013.01); *C08F 4/65912* (2013.01);
(Continued)

(58) Field of Classification Search
CPC .............. C08F 2500/04; C08F 2500/05; C08F 2500/12; C08F 10/02; C08F 210/02; C08F 210/16; C08L 23/06; C08L 23/08
See application file for complete search history.

(56) References Cited

U.S. PATENT DOCUMENTS 5,032,562 A 7/1991 Lo et al.
5,183,867 A 2/1993 Welborn, Jr.
(Continued)

FOREIGN PATENT DOCUMENTS

EP 0676418 A 10/1995
EP 2003166 A 12/2008
(Continued)

OTHER PUBLICATIONS

Chen, K. et al., "Modeling and Simulation of Borstar Bimodal Polyethylene Process Based on a Rigorous PC-SAFT Equation of State Model", Industrial & Engineering Chemistry Research, vol. 53, Issue 51, pp. 19905-19915, 2004.
(Continued)

*Primary Examiner* — Vu A Nguyen
(74) *Attorney, Agent, or Firm* — Kristina M. Okafor; Leandro Arechederra, III

(57) ABSTRACT

This invention relates to new multimodal and/or broad molecular weight high density polyethylene polymers. The polymers may be made in a single reactor, preferably a gas
(Continued)

phase reactor using a dual catalyst system comprising a pyridyldiamido transition metal compound, a metallocene compound, a support, and optionally an activator.

10 Claims, 5 Drawing Sheets

(51) Int. Cl.
*C08F 210/16* (2006.01)
*C08F 4/6592* (2006.01)

(52) U.S. Cl.
CPC ...... *C08F 4/65916* (2013.01); *C08F 4/65925* (2013.01); *C08F 2500/04* (2013.01); *C08F 2500/05* (2013.01); *C08F 2500/12* (2013.01)

(56) References Cited

U.S. PATENT DOCUMENTS

| | | | |
|---|---|---|---|
| 5,525,678 A | 6/1996 | Mink et al. | |
| 6,103,657 A | 8/2000 | Murray | |
| 6,828,394 B2 | 12/2004 | Vaughan et al. | |
| 6,900,321 B2 | 5/2005 | Boussie et al. | |
| 6,956,094 B2 | 10/2005 | Mawson et al. | |
| 6,964,937 B2 | 11/2005 | Mink et al. | |
| 6,995,109 B2 | 2/2006 | Mink et al. | |
| 7,129,302 B2 | 10/2006 | Mink et al. | |
| 7,141,632 B2 | 11/2006 | Vaughan et al. | |
| 7,172,987 B2 | 2/2007 | Kao et al. | |
| 7,199,072 B2 | 4/2007 | Crowther et al. | |
| 7,595,364 B2 | 9/2009 | Shannon et al. | |
| 7,619,047 B2 | 11/2009 | Yang et al. | |
| 7,855,253 B2 | 12/2010 | Shannon et al. | |
| 7,868,092 B2 * | 1/2011 | Kwalk | C08L 23/06 525/191 |
| 7,973,116 B2 | 7/2011 | Hagadorn et al. | |
| 8,138,113 B2 | 3/2012 | Yang et al. | |
| 8,378,029 B2 | 2/2013 | Liu et al. | |
| 2002/0142912 A1 | 10/2002 | Boussie et al. | |
| 2006/0275571 A1 | 12/2006 | Mure et al. | |
| 2011/0118417 A1* | 5/2011 | Liu | C08F 10/00 525/240 |
| 2014/0127427 A1 | 5/2014 | Vantomme et al. | |
| 2014/0163181 A1 | 6/2014 | Yang et al. | |
| 2014/0256893 A1 | 9/2014 | Hagadorn et al. | |
| 2014/0316089 A1 | 10/2014 | Hagadorn et al. | |
| 2015/0141590 A1 | 5/2015 | Hagadorn et al. | |
| 2016/0032027 A1 | 2/2016 | St. Jean et al. | |

FOREIGN PATENT DOCUMENTS

| | | |
|---|---|---|
| WO | 95/13871 A | 5/1995 |
| WO | 97/35891 A | 10/1997 |
| WO | 98/49209 A | 11/1998 |
| WO | 2007/067259 A | 6/2007 |
| WO | 2012/158260 A | 11/2012 |
| WO | 2013/028283 A | 2/2013 |
| WO | 2014/123683 A | 8/2014 |
| WO | 2015/138674 A | 9/2015 |
| WO | 2016/018696 A | 2/2016 |

OTHER PUBLICATIONS

Sheu, S., "Enhanced Bimodal PE make the impossible", Presentation, Borouge Pte Ltd., Shanghai, 2006.

* cited by examiner

MULTIMODAL AND BROAD MOLECULAR WEIGHT HIGH DENSITY POLYETHYLENE

CROSS-REFERENCE TO RELATED APPLICATIONS

This application is a National Phase Application claiming priority to PCT Application Serial No. PCT/US2016/028423 filed Apr. 20, 2016, and claims the benefit of and priority to U.S. Provisional Application No. 62/149,807, filed Apr. 20, 2015; EP Application No.: 15171803.8, filed Jun. 12, 2015; and PCT application PCT/US/2016/021757, filed Mar. 10, 2016, the disclosures of which are hereby incorporated by reference in their entireties.

FIELD OF INVENTION

This invention relates to new multimodal and broad molecular weight high density polyethylenes polymers. The polymers may be made in a single reactor, preferably a gas phase reactor using a dual catalyst system comprising a pyridyldiamido transition metal compound, a metallocene compound, a support, and optionally an activator.

BACKGROUND OF INVENTION

Polyolefins, such as polyethylenes, having high molecular weight generally have improved mechanical properties over their lower molecular weight counterparts. However, high molecular weight polyolefins can be difficult to process and costly to produce. Polyolefins with lower molecular weights generally have improved processing properties. Polyolefins having a bimodal or broad molecular weight distribution, having a high molecular weight fraction (HMWF) and a low molecular weight fraction (LMWF), are desirable because they can combine the advantageous mechanical properties of the HMWF with the improved processing properties of the LMWF.

It is highly desirable to be able to produce multimodal and/or broad molecular weight distribution (MWD) polyolefins, such as multimodal high density polyethylene (HDPE) compositions, for applications including film, pressure pipe, corrugated pipe, and blow molding, e.g., Household Industrial Containers (HIC) and Large Part Blow Molding (LPBM). These compositions ideally should have excellent processability, as evidenced by high melt strength and extrusion high specific throughput with low head pressure, as well as good mechanical properties. Slow crack resistance (SCR), demonstrated by good performance in the Environmental Stress Crack Resistance (ESCR) and Notched Constant Ligament-Stress (NCLS) tests, is particularly important for HDPE-based pipe applications and recent industry specifications, e.g., ISO PE 100, are stringent in this respect. Strong SCR performance reduces the possibility of a pipe or blow molded article failing mechanically or structurally over the course of its lifetime. Additionally, it can enable the ability to lightweight blow molded articles (e.g., drums, containers, fuel tanks) and downgauge films, reducing material consumption and yielding significant cost savings.

Recent efforts to achieve the desired property balance in multimodal HDPE compositions have involved trying to make polymers with a Broad Orthogonal Composition Distribution (BOCD), where most or all of the comonomer is incorporated in the HMWF. BOCD is thought to enhance the formation of tie chains in the HMWF, leading to improved stiffness, toughness, and SCR. Conventional attempts to make multimodal BOCD HDPE compositions have used one of two approaches: 1) multiple reactors in series or parallel, typically with Ziegler-Natta catalyst systems, or 2) post-reactor melt blending. It is difficult and costly to obtain a completely homogenized blend with either approach, and lack of homogenization is detrimental to polymer properties. Additionally, the use of multiple reactors in series or parallel is typically not efficient or cost effective. It adds substantially to the capital cost of a commercial plant and limits the production rate relative to single reactor processes, especially single reactor gas phase processes.

Bimetallic catalysts such as those disclosed in U.S. Pat. Nos. 5,032,562; 5,525,678; and EP 0,729,387 can produce bimodal polyolefins in a single reactor. These catalysts typically include a non-metallocene catalyst component and a metallocene catalyst component which produce polyolefins having different average molecular weights. U.S. Pat. No. 5,525,678, for example, discloses a bimetallic catalyst including a titanium non-metallocene component which produces a HMWF, and a zirconium metallocene component which produces a LMWF.

Pyridyldiamido transition metal complexes have also been used to polymerize olefins, e.g., U.S. Pat. No. 7,973,116. Other background references include EP 0,676,418; EP 2,003,166; WO 98/49209; WO 97/35891; WO 2007/067259; WO 2012/158260; U.S. Pat. Nos. 5,183,867; 6,995,109; 7,199,072; 7,141,632; 7,172,987; 7,129,302; 6,103,657; 6,964,937; 6,956,094; 6,828,394; 6,900,321; 8,378,029; 7,619,047; 7,855,253; 7,595,364; 8,138,113; US 2002/0142912; US 2006/275571; US 2014/0127427; US 2016/0032027; and US 2014/0127427. Publications for additional background include Sheu, Steven, "Enhanced Bimodal PE Makes the Impossible Possible," *TAPPI*, October 2006, Web; and Chen, Keran et al., "Modeling and Simulation of Borstar Polyethylene Process Based on a Rigorous PC-SAFT Equation of State Model," *Ind. Eng. Chem. Res.*, 2014, 53, pp. 19905-19915.

There is a need for improved multimodal and/or broad MWD HDPE compositions for applications including film, pipe, and blow molding, the compositions having one or more of BOCD, strong SCR performance, improved stiffness and toughness, and excellent processing properties. Ideally, such compositions are capable of being produced in a single reactor, such as a single gas phase reactor, to increase commercial efficiency and reduce costs.

SUMMARY OF THE INVENTION

This invention relates to multimodal ethylene polymer comprising a low molecular weight fraction, LMWF, having a molecular weight of less than 100 kg/mol and a high molecular weight fraction, HMWF, having a molecular weight of more than 700 kg/mol, the polymer characterized by:
  a. at least 50 mol % ethylene;
  b. a density of 0.938 to 0.965 g/cm$^3$ according to ASTM D1505;
  c. a medium load melt index, $I_5$, measured according to ASTM D1238 (190° C., 5 kg weight), of 0.05 to 50 g/10 min;
  d. a flow index, $I_{21}$, measured according to ASTM D1238 (190° C., 21.6 kg weight), of 0.1 to 100 g/10 min;
  e. a ratio of Mz/Mw of greater than 5.5; and
  f. at least two inflection points in a GPC-4D trace;
wherein the polymer is produced in situ in a single reactor.

This invention further relates to a multimodal ethylene polymer comprising a low molecular weight fraction, LMWF, having a molecular weight of less than 100 kg/mol and a high molecular weight fraction, HMWF, having a molecular weight of more than 700 kg/mol, the polymer characterized by:
  a. at least 50 mol % ethylene;
  b. a density of 0.938 to 0.965 g/cm$^3$ according to ASTM D1505;
  c. a medium load melt index, $I_5$, measured according to ASTM D1238 (190° C., 5 kg weight), of 0.05 to 50 g/10 min;
  d. a flow index, $I_{21}$, measured according to ASTM D1238 (190° C., 21.6 kg weight), of 0.1 to 100 g/10 min;
  e. at least two inflection points in a GPC-4D trace;
  f. a shear thinning ratio, $\eta*(0.01\ rad/s)/\eta*(0.18\ rad/s)$, at 190° C. of at least 5;
  g. a phase angle, $\delta=\tan^{-1}(G''/G')$, of less than 30 in a van Gurp-Palmen plot at a complex modulus $G^*$ of about $5\times10^4$ Pa;
  h. a strain hardening ratio, SHR, via SER of greater than 10 at a Hencky strain rate of 0.1 s$^{-1}$ and/or 1 10 s$^{-1}$;
  i. a melt strength via RHEOTENS at a 190° C. die temperature of greater than 22 cN; and
  j. an environmental stress crack resistance, ESCR, measured according to ASTM D1693, Condition B, 10% IGEPAL CO-360, of greater than 3,000 hours.

This invention also relates to an ethylene polymer comprising a low molecular weight fraction, LMWF, having a molecular weight of less than 100 kg/mol and a high molecular weight fraction, HMWF, having a molecular weight of more than 700 kg/mol, the polymer having:
  a. at least 50 mol % ethylene;
  b. a density of 0.938 to 0.965 g/cm$^3$ according to ASTM D1505;
  c. a medium load melt index, $I_5$, measured according to ASTM D1238 (190° C., 5 kg weight), of 0.05 to 50 g/10 min;
  d. a flow index, $I_{21}$, measured according to ASTM D1238 (190° C., 21.6 kg weight), of 0.1 to 100 g/10 min;
  e. a molecular weight distribution, Mw/Mn, of at least 25; and
  f. a ratio of Mz/Mw of at least 5.5;
wherein the polymer is produced in situ in a single reactor.

Advantageously, the ethylene polymers disclosed herein can be made in situ in a single reactor, such as a single gas phase, slurry, or solution phase reactor, employing a dual catalyst system comprising a pyridyldiamido transition metal compound, a metallocene compound, a support, and optionally an activator. The ethylene polymers disclosed herein have an improved combination of processing and mechanical properties over conventional compositions. They display exceptional shear thinning properties and high melt strengths, and strain hardening properties similar to that of low density polyethylene (LDPE) for the entire range of achievable strain rates, i.e. 0.01 to 10 s$^{-1}$. They exhibit excellent SCR, demonstrated by ESCR and NCLS test performance. These properties make the compositions particularly useful for film, pipe, and blow molding applications and enable lightweighting of blow molded articles and downgauging of films, reducing material consumption and costs.

DETAILED DESCRIPTION OF THE INVENTION

Figure 1:
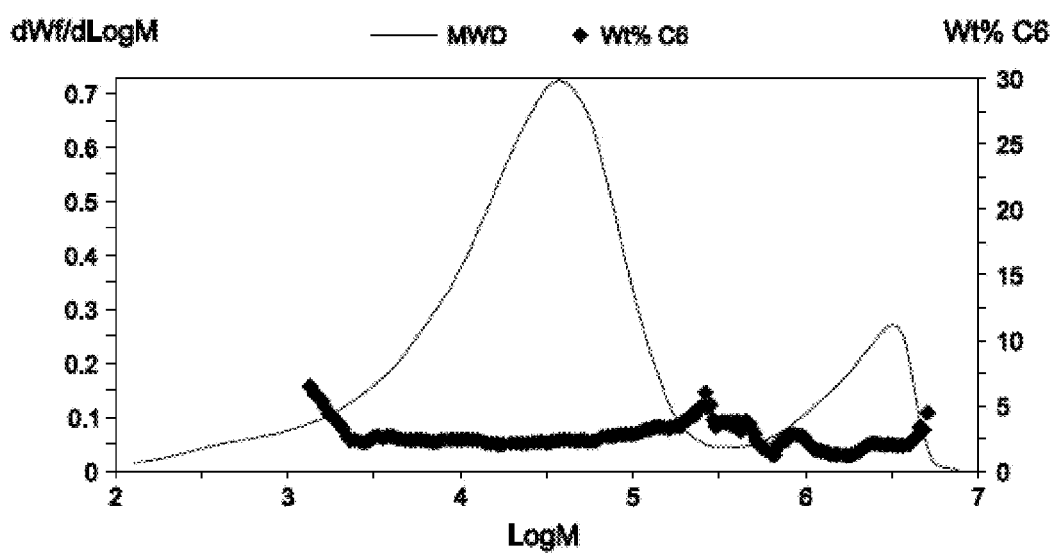
FIG. 1 is a GPC graph showing molecular weight attributes for a sample of polyethylene according to the invention.

As used herein, the numbering scheme for the Periodic Table groups is the new notation as set out in Chemical and Engineering News, 63(5), 27, (1985).

For purposes of this invention, a hydrocarbyl radical is defined to be a $C_1$-$C_{100}$ radical that may be linear, branched, or cyclic, and when cyclic, may be aromatic or non-aromatic. The terms "hydrocarbyl radical," "hydrocarbyl," and "hydrocarbyl group" are used interchangeably throughout this document.

Substituted hydrocarbyl radicals are radicals in which at least one hydrogen atom of the hydrocarbyl radical has been substituted with at least one functional group such as NR*$_2$, OR*, SeR*, TeR*, PR*$_2$, AsR*$_2$, SbR*$_2$, SR*, BR*$_2$, SiR*$_3$, GeR*$_3$, SnR*$_3$, PbR*$_3$ and the like, or where at least one heteroatom has been inserted within a hydrocarbyl ring.

The term "aryl" or "aryl group" means a six carbon aromatic ring and the substituted variants thereof, including but not limited to, phenyl, 2-methyl-phenyl, xylyl, 4-bromoxylyl. Likewise heteroaryl means an aryl group where a ring carbon atom (or two or three ring carbon atoms) has been replaced with a heteroatom, preferably, N, O, or S.

This invention relates to multimodal ethylene polymer comprising a low molecular weight fraction, LMWF, having a molecular weight of less than 100 kg/mol and a high molecular weight fraction, HMWF, having a molecular weight of more than 700 kg/mol, the polymer characterized by:
  a. at least 50 mol % ethylene;
  b. a density of 0.938 to 0.965 g/cm$^3$ according to ASTM D1505;
  c. a medium load melt index, $I_5$, measured according to ASTM D1238 (190° C., 5 kg weight), of 0.05 to 50 g/10 min;
  d. a flow index, $I_{21}$, measured according to ASTM D1238 (190° C., 21.6 kg weight), of 0.1 to 100 g/10 min;
  e. a ratio of Mz/Mw of greater than 5.5; and
  f. at least two inflection points in a GPC-4D trace;
wherein the polymer is produced in situ in a single reactor.

This invention further relates to a multimodal ethylene polymer comprising a low molecular weight fraction, LMWF, having a molecular weight of less than 100 kg/mol and a high molecular weight fraction, HMWF, having a molecular weight of more than 700 kg/mol, the polymer characterized by:
  a. at least 50 mol % ethylene;
  b. a density of 0.938 to 0.965 g/cm$^3$ according to ASTM D1505;
  c. a medium load melt index, $I_5$, measured according to ASTM D1238 (190° C., 5 kg weight), of 0.05 to 50 g/10 min;
  d. a flow index, $I_{21}$, measured according to ASTM D1238 (190° C., 21.6 kg weight), of 0.1 to 100 g/10 min;
  e. at least two inflection points in a GPC-4D trace;

f. a shear thinning ratio, $\eta^*(0.01\ \text{rad/s})/\eta^*(0.18\ \text{rad/s})$, at 190° C. of at least 5;
g. a phase angle, $\delta=\tan^{-1}(G''/G')$, of less than 30 in a van Gurp-Palmen plot at a complex modulus G* of about $5\times10^4$ Pa;
h. a strain hardening ratio, SHR, via SER of greater than 10 at a Hencky strain rate of 0.1 $s^{-1}$ and/or 1 10 $s^{-1}$;
i. a melt strength via RHEOTENS at a 190° C. die temperature of greater than 22 cN; and
j. an environmental stress crack resistance, ESCR, measured according to ASTM D1693, Condition B, 10% IGEPAL CO-360, of greater than 3,000 hours.

This invention also relates to an ethylene polymer comprising a low molecular weight fraction, LMWF, having a molecular weight of less than 100 kg/mol and a high molecular weight fraction, HMWF, having a molecular weight of more than 700 kg/mol, the polymer having:
g. at least 50 mol % ethylene;
h. a density of 0.938 to 0.965 g/cm³ according to ASTM D1505;
i. a medium load melt index, $I_5$, measured according to ASTM D1238 (190° C., 5 kg weight), of 0.05 to 50 g/10 min;
j. a flow index, $I_{21}$, measured according to ASTM D1238 (190° C., 21.6 kg weight), of 0.1 to 100 g/10 min;
k. a molecular weight distribution, Mw/Mn, of at least 25; and
l. a ratio of Mz/Mw of at least 5.5;
wherein the polymer is produced in situ in a single reactor.

Advantageously, the ethylene polymers disclosed herein can be made in situ in a single reactor, such as a single gas phase, slurry, or solution phase reactor, employing a dual catalyst system comprising a pyridyldiamido transition metal compound, a metallocene compound, a support, and optionally an activator. By "in situ" herein, it is meant that there has been no post-reactor blending, vulcanization, or the like, but rather the polymer is formed from the polymerization process itself.

The ethylene polymers disclosed herein have an improved combination of processing and mechanical properties over conventional compositions. They display exceptional shear thinning properties and high melt strengths, and strain hardening properties similar to that of low density polyethylene (LDPE) for the entire range of achievable strain rates, i.e. 0.01 to 10 $s^{-1}$. They exhibit excellent SCR, demonstrated by ESCR and NCLS test performance. These properties make the compositions particularly useful for film, pipe, and blow molding applications and enable lightweighting of blow molded articles and downgauging of films, reducing material consumption and costs.

The ethylene polymers disclosed herein comprise at least 50 mol %, at least 60 mol %, at least 70 mol %, at least 80 mol %, at least 85 mol %, or at least 90 mol % ethylene. When a polymer is said to have, for example, an ethylene content of at least 50 mol %, it is understood that the mer unit in the copolymer is derived from ethylene and said derived units are present at least 50 mol %.

The ethylene polymers disclosed herein have a density of from 0.938 to 0.965 g/cm³. For example, they may have a density from a low of 0.938, 0.940, 0.945, or 0.950 to a high of 0.960 or 0.965 g/cm³, including any combination of any upper or lower value disclosed herein. Density herein is measured according to ASTM D1505-10 using a density-gradient column on a compression-molded specimen that has been slowly cooled to room temperature (i.e., over a period of 10 minutes or more) and allowed to age for a sufficient time that the density is constant within +/−0.001 g/cm³. Compression molded specimens for density measurements are made according to ASTM D4703-10a. Unless otherwise indicated, the specimens are typically made from pelleted polymers and conditioned for 40 hours at 23° C. before the density measurement. In the case of specimens made from reactor granule samples, an accelerated conditioning of 2 hours at 23° C. is used.

The ethylene polymers disclosed herein may have a melt index, $I_2$, measured according to ASTM D1238 (190° C., 2.16 kg weight), of 0.01 to 50 g/10 min, such as from a low of 0.01, 0.03, 0.05, or 0.07 g/10 min to a high of 0.3, 0.5, 1, 10, 15, 20, or 30 g/10 min, including any combination of any upper or lower value disclosed herein.

The ethylene polymers disclosed herein may have a flow index, $I_{21}$, measured according to ASTM D1238 (190° C., 21.6 kg weight), of 0.01 to 100 g/10 min, such as from a low of 0.01, 0.5, 1, or 2 g/10 min to a high of 10, 15, 20, 30, 50, 70, or 100 g/10 min, including any combination of any upper or lower value disclosed herein.

The ethylene polymers disclosed herein may have a medium load melt index, $I_5$, measured according to ASTM D1238 (190° C., 5 kg weight), of 0.05 to 50 g/10 min, such as from a low of 0.05, 0.1, or 0.5 g/10 min to a high of 10, 20, 30, or 50 g/10 min, including any combination of any upper or lower value disclosed herein.

The ethylene polymers disclosed herein have a multi-modal molecular weight distribution or a very broad molecular weight distribution, determined by Gel Permeation Chromatography (GPC) as described further below. They may exhibit at least two inflection points in a GPC-4D trace, an inflection point being the point where the second derivative of the curve changes in sign (e.g., from negative to positive or vice versa). They may also exhibit at least three inflection points in a GPC-4D trace.

The ethylene polymers disclosed herein have improved shear thinning properties, as demonstrated by the shear thinning ratio. As used herein, the shear thinning ratio is the ratio of complex viscosity, $\eta^*$, at a first frequency to complex viscosity, $\eta^*$, at a second frequency, measured via Small Amplitude Oscillatory Shear (SAOS) test as is described further below. When shear thinning ratio is used herein, the first and second frequencies will be specified. For example, the shear thinning ratio, $\eta^*(0.01\ \text{rad/s})/\eta^*(0.18\ \text{rad/s})$, is the ratio of complex viscosity at a frequency of 0.01 rad/s to complex viscosity at a frequency of 0.18 rad/s. The ethylene polymers disclosed herein may have a shear thinning ratio, $\eta^*(0.01\ \text{rad/s})/\eta^*(0.18\ \text{rad/s})$, of at least 5, and preferably at least 7. They may also have a shear thinning ratio, $\eta^*(0.18\ \text{rad/s})/\eta^*(118\ \text{rad/s})$, of at least 100, and preferably at least 200.

The ethylene polymers disclosed herein comprise a low molecular weight fraction, LMWF, having a molecular weight of less than 100 kg/mol or less than 50 kg/mol, and a high molecular weight fraction, HMWF, having a molecular weight of more than 700 kg/mol, more than 1,000 kg/mol, or more than 1,500 kg/mol, including any combination of any upper or lower value disclosed herein. The ethylene polymers may comprise from 0.1 to 50 wt % of the HMWF, such as from a low of 0.1, 1, 5, 10, or 12 wt % to a high of 12.5, 15, 20, 25, 30, 40, or 50 wt %, including any combination of any upper or lower value disclosed herein. The HMWF is determined by integrating the area under the molecular weight versus dwt %/d Log M curve from a molecular weight of 700,000 to a molecular weight of 10,000,000.

The ethylene polymers disclosed herein generally have a broad molecular weight distribution (MWD). As used herein, Mn is number average molecular weight, Mw is weight average molecular weight, and Mz is z average molecular weight. MWD is Mw divided by Mn. The MWD of the ethylene polymers disclosed herein may be from 10 to 60, for example, from a low of 18, 25, 30, 35, or 40 to a high of 50, 55, or 60. The ethylene polymers may also have a ratio of Mz/Mw of at least 5.5.

The ethylene polymers disclosed herein have high melt elasticities, as may be demonstrated by a van Gurp-Palmen plot depicting a minimum phase angle versus complex modulus curve, as described further below. The inventive polymers may have a substantially lower phase angle relative to conventional multimodal or broad MWD HDPE compositions of comparable MI and density. For example, the inventive polymers may have a phase angle, $\delta = \tan^{-1}$ (G"/G'), of less than 30, preferably less than 20, at a complex modulus G* of about $5 \times 10^4$ Pa.

The ethylene polymers disclosed herein demonstrate improved strain hardening, and can achieve strain hardening properties similar to that of LDPE for the entire range of achievable strain rates, i.e. 0.01 to 10 $s^{-1}$. The ethylene polymers disclosed herein may have a strain hardening ratio, SHR, via SER of greater than 10, greater than 20, or greater than 30 at a Hencky strain rate of 0.1 and/or 1 $s^{-1}$. The method for measuring SHR via SER is described further below.

The ethylene polymers disclosed herein may have a melt strength via RHEOTENS at a 190° C. die temperature of greater than 30 cN. Higher melt strengths are an indication of improved processing properties for the polymer, such as improved bubble stability during film blowing or improved parison formation during blow molding. The method for measuring melt strength via RHEOTENS is described further below.

The ethylene polymers disclosed herein may have an ESCR value of greater than 3,000 hours, greater than 4,000 hours, or even greater than 5,000 hours. ESCR is measured according to ASTM D1693, Condition B, 10% IGEPAL CO-360 at 50° C.

The ethylene polymers disclosed herein may have an NCLS value of greater than 800 hours, greater than 1,000 hours, or even greater than 1,500 hours. NCLS is measured according to ASTM D 2136, 10% IGEPAL CO-360 at 50° C. and 800 psi.

Pyridyldiamido Transition Metal Complex

The ethylene polymers disclosed herein are preferably made using a supported dual catalyst system comprising a pyridyldiamido transition metal compound, a metallocene compound, a support, and optionally an activator.

In one aspect of the invention, the supported catalyst systems comprise a pyridyldiamido transition metal complex having the general formula (I):

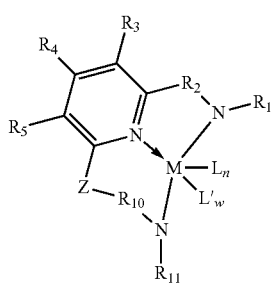

(I)

M is a Group 3, 4, 5, 6, 7, 8, 9, 10, 11, or 12 metal, preferably, a group 4 metal, more preferably, Ti, Zr, or Hf;

Z is —$(R_{14})_pC$—$C(R_{15})_q$—, where $R_{14}$ and $R_{15}$ are independently selected from the group consisting of hydrogen, hydrocarbyls, and substituted hydrocarbyls, (preferably, hydrogen and alkyls), and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 1 or 2, and q is 1 or 2;

$R_1$ and $R_{11}$ are independently selected from the group consisting of hydrocarbyls, substituted hydrocarbyls, and silyl groups (preferably, alkyl, aryl, heteroaryl, and silyl groups);

$R_2$ and $R_{10}$ are each, independently, -$E(R_{12})(R_{13})$— with E being carbon, silicon, or germanium, and each $R_{12}$ and $R_{13}$ being independently selected from the group consisting of hydrogen, hydrocarbyl, and substituted hydrocarbyl, alkoxy, silyl, amino, aryloxy, halogen, and phosphino (preferably, hydrogen, alkyl, aryl, alkoxy, silyl, amino, aryloxy, heteroaryl, halogen, and phosphino), $R_{12}$ and $R_{13}$ may be joined to each other or to $R_{14}$ or $R_{15}$ to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to form a saturated heterocyclic ring, or a saturated substituted heterocyclic ring where substitutions on the ring can join to form additional rings;

$R_3$, $R_4$, and $R_5$ are independently selected from the group consisting of hydrogen, hydrocarbyls, substituted hydrocarbyls, alkoxy, aryloxy, halogen, amino, and silyl, (preferably, hydrogen, alkyl, alkoxy, aryloxy, halogen, amino, silyl, and aryl), and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3 or 4.

Preferably, the R groups above and other R groups mentioned hereafter, contain up to 30, preferably, no more than 30 carbon atoms, especially from 2 to 20 carbon atoms.

Preferably, the group represented by E is carbon, and $R_1$ and $R_{11}$ are independently selected from phenyl groups that are variously substituted with between zero to five substituents that include F, Cl, Br, I, $CF_3$, $NO_2$, alkoxy, dialkylamino, hydrocarbyl, and substituted hydrocarbyls, groups with from one to ten carbons.

Preferably, the group represented by L is selected from halide, alkyl, aryl, alkoxy, amido, hydrido, phenoxy, hydroxy, silyl, allyl, alkenyl, and alkynyl; and the group represented by L' is selected from ethers, thio-ethers, amines, nitriles, imines, pyridines, and phosphines.

In one preferred embodiment, Z is defined as an aryl so that the complex corresponds to formula (II):

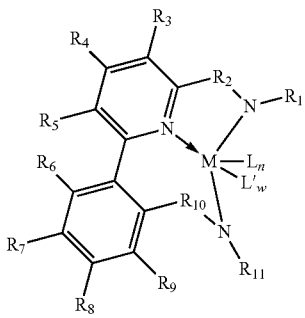

(II)

wherein:
$R_6$, $R_7$, $R_8$, and $R_9$ are independently selected from the group consisting of hydrogen, hydrocarbyls, substituted hydrocarbyls, alkoxy, halogen, amino, and silyl, and the pairs of positions, and wherein adjacent R groups ($R_6$&$R_7$, and/or $R_7$&$R_8$, and/or $R_8$&$R_9$, and/or $R_9$&$R_{10}$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R_1$, $R_2$, $R_3$, $R_4$, $R_5$, $R_{10}$ and $R_{11}$ are as defined above.

In a preferred embodiment, $R_1$ and $R_{11}$ may be independently selected from phenyl groups that are variously substituted with between zero to five substituents that include F, Cl, Br, I, $CF_3$, $NO_2$, alkoxy, dialkylamino, aryl, and alkyl groups with between one to ten carbons.

In a more preferred embodiment, the complexes of this invention are of the formula (III):

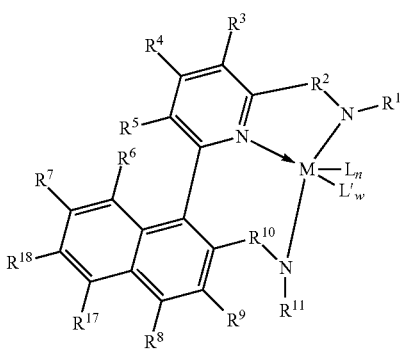

(III)

wherein:
$R^6$, $R^7$, $R^8$, $R^9$, $R^{16}$, and $R^{17}$ are independently selected from the group consisting of hydrogen, hydrocarbyls, substituted hydrocarbyls, alkoxy, halogen, amino, and silyl, and wherein adjacent R groups ($R^6$ & $R^7$, and/or $R^7$ & $R^{16}$, and/or $R^{16}$ & $R^{17}$, and/or $R^8$ & $R^9$) may be joined to form a saturated, substituted or unsubstituted hydrocarbyl or heterocyclic ring, where the ring has 5, 6, 7, or 8 ring carbon atoms and where substitutions on the ring can join to form additional rings; and M, L, L', w, n, $R^1$, $R^2$, $R^3$, $R^4$, $R^5$, $R^{10}$ and $R^{11}$ are defined as above.

These complexes may be used in combination with appropriate activators for olefin polymerization such as ethylene-based polymers or propylene-based polymers, including ethylene-hexene polymerization.

In further embodiments, it is preferred that $R_1$ to $R_{13}$ contain up to 30 and no more than 30 carbon atoms, especially from 2 to 20 carbon atoms. $R_1$ and $R_{11}$ substituted on the nitrogen atom are preferably, selected from aryl group containing from 6 to 30 carbon atoms, especially phenyl groups. It is preferred that $R_1$ and $R_{11}$ be chosen from aryl or alkyl groups and that $R_{12}$ through $R_{15}$ be independently chosen from hydrogen, alkyl, and aryl groups, such as phenyl. The phenyl groups may be alkyl substituted. The alkyl substituents may be straight chain alkyls but include branched alkyls.

Preferably, each $R_1$ and $R_{11}$ are a substituted phenyl group with either one or both of the carbons adjacent to the carbon joined to the amido nitrogen being substituted with a group containing between one to ten carbons. Some specific examples would include $R_1$ and $R_{11}$ being chosen from a group including 2-methylphenyl, 2-isopropylphenyl, 2-ethylphenyl, 2,6-dimethylphenyl, mesityl, 2,6-diethylphenyl, and 2,6-diisopropylphenyl.

$R_2$ is preferably, selected from moieties where E is carbon, especially a moiety —C($R_{12}$)($R_{13}$)— where $R_{12}$ is hydrogen and $R_{13}$ is an aryl group or a benzyl group (preferably, a phenyl ring linked through an alkylene moiety such as methylene to the C atom). The phenyl group may then be substituted as discussed above. Preferably, $R_3$ to $R_9$ are hydrogen or alkyl from 1 to 4 carbon atoms. Preferably, 0, 1 or 2 of $R_3$ to $R_9$ are alkyl substituents.

The pyridyldiamido metal complex (I) is coordinated to the metal center as a tridentate ligand through two amido donors and one pyridyl donor. The metal center M is a transition metal from Groups 3 to 12. While in its use as a catalyst, according to current theory M is preferably, in its four valent state, it is possible to create compounds in which M has a reduced valency state and regains its formal valency state upon preparation of the catalysts system by contacting with an activator. Preferably, in addition to the pyridyldiamido ligand, the metal M is also coordinated to n number of anionic ligands, with n being from 1 to 4. The anionic donors are typically halide or alkyl, but a wide range of other anionic groups are possible including some that are covalently linked together to form molecules that could be considered dianionic, such as oxalate. For certain complexes it is likely that up to three neutral Lewis bases (L'), typically ethers, could also be coordinated to the metal center. In a preferred embodiment w is 0, 1, 2 or 3.

A preferred synthesis of the pyridyldiamido complexes is reaction of the neutral pyridyldiamine ligand precursors with a metalloamide, including $Zr(NMe_2)_4$, $Zr(NEt_2)_4$, $Hf(NMe_2)_4$, and $Hf(NEt_2)_4$. Another preferred synthesis of the pyridyldiamido complexes is the reaction of the neutral pyridyldiamine ligand precursors with an organolithium reagent to form the dilithio pyridyldiamido derivative followed by reaction of this species with either a transition metal salt, including $ZrCl_4$, $HfCl_4$, $ZrCl_4$(1,2-dimethoxyethane), $HfCl_4$(1,2-dimethoxyethane), $ZrCl_4$(tetrahydrofuran)$_2$, $HfCl_4$(tetrahydrofuran)$_2$, $ZrBn_2Cl_2(OEt_2)$, $HfBn_2Cl_2(OEt_2)$. Another preferred synthesis of the pyridyldiamido complexes is reaction of the neutral pyridyldiamine ligand precursors with an organometallic reactant, including $ZrBn_4$, $ZrBn_2Cl_2(OEt_2)$, $Zr(CH_2SiMe_3)_4$, $Zr(CH_2CMe_3)_4$, $HfBn_4$, $HfBn_2Cl_2(OEt_2)$, $Hf(CH_2SiMe_3)_4$, $Hf(CH_2CMe_3)_4$.

Metallocene Compound

As used herein, the "metallocene compound" in this invention may include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom.

Hereinafter, these compounds will be referred to as "metallocenes" or "metallocene catalyst components".

In one aspect, the one or more metallocene catalyst components are represented by the formula (IV):

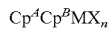
$Cp^A Cp^B MX_n$

The metal atom "M" of the metallocene catalyst compounds may be selected from the group consisting of Groups 3 through 12 atoms in one embodiment, and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and a Ti, Zr, Hf atoms in yet a more particular embodiment, and Zr in yet a more particular embodiment. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

M is as described above; each X is chemically bonded to M; each Cp group is chemically bonded to M; and n is 0, 1, 2, 3, 4, and either 1 or 2 in a particular embodiment.

The ligands represented by $Cp^A$ and $Cp^B$ in formula (IV) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of cyclopentadienyl, indenyl, tetrahydroindenyl, fluorenyl, and substituted derivatives of each.

Independently, each $Cp^A$ and $Cp^B$ of formula (IV) may be unsubstituted or substituted with any one or combination of substituent groups R. Non-limiting examples of substituent groups R as used in structure (IV) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular, non-limiting examples of alkyl substituents R associated with formula (IV) includes methyl, ethyl, propyl, butyl, pentyl, hexyl, cyclopentyl, cyclohexyl, benzyl, phenyl, methylphenyl, and tert-butylphenyl groups and the like, including all their isomers, for example, tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron, for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as, but not limited to, olefinically unsaturated substituents including vinyl-terminated ligands, for example, 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R, such as 1-butanyl, may form a bonding association to the element M.

Each X in formula (IV) is independently selected from the group consisting of: any leaving group in one embodiment; halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In another embodiment, X is $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment.

Other non-limiting examples of X groups in formula (IV) include amines, phosphines, ethers, carboxylates, dienes, hydrocarbon radicals having from 1 to 20 carbon atoms, fluorinated hydrocarbon radicals (e.g., $-C_6F_5$ (pentafluorophenyl)), fluorinated alkylcarboxylates (e.g., $CF_3C(O)O^-$), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methyoxy, ethyoxy, propoxy, phenoxy, bis(N-methylanilide), dimethylamide, dimethylphosphide radicals and the like. In one embodiment, two or more X's form a part of a fused ring or ring system.

In another aspect, the metallocene catalyst component includes those of formula (IV) where $Cp^A$ and $Cp^B$ are bridged to each other by at least one bridging group (A), such that the structure is represented by formula (V): $Cp^A(A)Cp^B MX_n$.

These bridged compounds represented by formula (V) are known as "bridged metallocenes". $Cp^A$, $Cp^B$, M, X and n are as defined above for formula (IV); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as, but not limited to, at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (IV) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $—Si(R')_2Si(R'_2)—$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (V) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example, 4 to 10, 5 to 7 ring members in a more particular embodiment. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, CO in one embodiment. The one or more Cp groups which the above cyclic bridging moieties may, optionally, be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally, fused) ring structures may carry one or more substituents. Illustrative, non-limiting examples of these substituents are hydrocarbyl (particularly, alkyl) groups and halogen atoms.

The ligands $Cp^A$ and $Cp^B$ of formula (IV) and (V) are different from each other in one embodiment, and the same in another embodiment.

In yet another aspect, the metallocene catalyst components include mono-ligand metallocene compounds (e.g., mono cyclopentadienyl catalyst components) such as described in WO 93/08221, for example. In this embodiment, the at least one metallocene catalyst component is a bridged "half-sandwich" metallocene represented by the formula (VI): $CP^A(A)QMX_n$, wherein $Cp^A$ is defined above and is bound to M; (A) is defined above and is a bridging group bonded to Q and $Cp^A$; and wherein an atom from the Q group is bonded to M; and n is 0 or an integer from 1 to 3; 1 or 2 in a particular embodiment. In formula (VI), $Cp^A$, (A) and Q may form a fused ring system. The X groups and n of formula (VI) are as defined above in formula (IV) and (V). In one embodiment, $Cp^A$ is selected from the group consisting of cyclopentadienyl, indenyl, tetrahydroindenyl, fluorenyl, substituted versions thereof, and combinations thereof.

In formula (VI), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen or sulfur atom in a more particular embodiment, and nitrogen and oxygen in yet a more particular embodiment. Non-limiting examples of Q groups include ethers, amines, phosphines, thioethers, alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene other compounds comprising Group 15 and Group 16 atoms capable of bonding with M.

In yet another aspect, the at least one metallocene catalyst component is an unbridged "half sandwich" metallocene represented by the formula (VII): $Cp^A MQ_q X_n$, wherein $Cp^A$ is defined as for the Cp groups in (IV) and is a ligand that is bonded to M; each Q is independently bonded to M; Q is also bound to $Cp^A$ in one embodiment; X is a leaving group as described above in (IV); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (VII), Q is selected from the group consisting of ROO, RO—, R(O)—, —NR—, —$CR_2$—, —S—, —$NR_2$, —$CR_3$, —SR, —$SiR_3$, —$PR_2$, —H, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In another embodiment, R is selected from $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ alkyls, and $C_2$ to $C_{20}$ heteroallyl moieties.

By "derivatives thereof", it is meant any substitution or ring formation as described above; and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine or chlorine; n is 1, 2 or 3.

It is contemplated that the metallocene catalyst components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The metallocene catalyst component may comprise any combination of any "embodiment" described herein.

Metallocene compounds are known in the art and any one or more may be utilized herein. Suitable metallocenes include, but are not limited to, all of the metallocenes disclosed and referenced in the US patents cited above, as well as those disclosed and referenced in U.S. Pat. Nos. 7,179,876; 7,169,864; 7,157,531; 7,129,302; 6,995,109; 6,958,306; 6,884,748; 6,689,847; US Patent publication 2007/0055028, and published PCT Applications WO 97/22635; WO 00/699/22; WO 01/30860; WO 01/30861; WO 02/46246; WO 02/50088; WO 04/026921; and WO 06/019494, all fully incorporated herein by reference. Additional catalysts suitable for use herein include those referenced in U.S. Pat. Nos. 6,309,997; 6,265,338; US Patent publication 2006/019925, and the following articles: Chem Rev 2000, 100, 1253; Resconi; Chem Rev 2003, 103, 283; Chem Eur. J. 2006, 12, 7546 Mitsui; J Mol Catal A 2004, 213, 141; Macromol Chem Phys, 2005, 206, 1847; and J Am Chem Soc 2001, 123, 6847.

Exemplary metallocene compounds used herein are selected from the group consisting of:
bis(cyclopentadienyl)zirconium dichloride,
bis(n-butylcyclopentadienyl)zirconium dichloride,
bis(n-butylcyclopentadienyl)zirconium dimethyl,
bis(pentamethylcyclopentadienyl)zirconium dichloride,
bis(pentamethylcyclopentadienyl)zirconium dimethyl,
bis(pentamethylcyclopentadienyl)hafnium dichloride,
bis(pentamethylcyclopentadienyl)zirconium dimethyl,
bis(1-methyl-3-n-butylcyclopentadienyl)zirconium dichloride,
bis(1-methyl-3-n-butylcyclopentadienyl)zirconium dimethyl,
bis(1-methyl-3-n-butylcyclopentadienyl)hafnium dichloride,
bis(1-methyl-3-n-butylcyclopentadienyl)zirconium dimethyl,
bis(indenyl)zirconium dichloride, bis(indenyl)zirconium dimethyl,
bis(tetrahydro-1-indenyl)zirconium dichloride,
bis(tetrahydro-1-indenyl)zirconium dimethyl,
(n-propyl cyclopentadienyl, pentamethyl cyclopentadienyl) zirconium dichloride,
and (n-propyl cyclopentadienyl, pentamethyl cyclopentadienyl)zirconium dimethyl.

Support Material

In embodiments of the invention herein, the catalyst systems comprise a support material. Preferably, the support material is a porous support material, for example, talc, and inorganic oxides. Other support materials include zeolites, clays, organoclays, or any other organic or inorganic support material, or mixtures thereof. As used herein, "support" and "support material" are used interchangeably.

Preferably, the support material is an inorganic oxide in a finely divided form. Suitable inorganic oxide materials for use in the supported catalyst systems herein include Groups 2, 4, 13, and 14 metal oxides such as silica, alumina, and mixtures thereof. Other inorganic oxides that may be employed, either alone or in combination, with the silica or alumina are magnesia, titania, zirconia, and the like. Other suitable support materials, however, can be employed, for example, finely divided functionalized polyolefins such as finely divided polyethylene. Particularly useful supports include magnesia, titania, zirconia, montmorillonite, phyllosilicate, zeolites, talc, clays, and the like. Also, combinations of these support materials may be used, for example, silica-chromium, silica-alumina, silica-titania, and the like. Preferred support materials include $Al_2O_3$, $ZrO_2$, $SiO_2$, and combinations thereof, more preferably, $SiO_2$, $Al_2O_3$, or $SiO_2/Al_2O_3$.

It is preferred that the support material, most preferably, an inorganic oxide, has a surface area in the range of from about 10 $m^2/g$ to about 700 $m^2/g$, pore volume in the range of from about 0.1 cc/g to about 4.0 cc/g, and average particle size in the range of from about 5 μm to about 500 μm. More preferably, the surface area of the support material is in the range of from about 50 $m^2/g$ to about 500 $m^2/g$, pore volume of from about 0.5 cc/g to about 3.5 cc/g, and average particle size of from about 10 μm to about 200 μm. Most preferably, the surface area of the support material is in the range of from about 100 $m^2/g$ to about 400 $m^2/g$, pore volume from about 0.8 cc/g to about 3.0 cc/g, and average particle size is from about 5 μm to about 100 μm. The average pore size of the support material useful in the invention is in the range of from 10 to 1,000 Å, preferably, 50 to about 500 Å, and most preferably, 75 to about 350 Å. In some embodiments, the support material is a high surface area, amorphous silica (surface area ≥300 $m^2$/gm, pore volume ≥1.65 $cm^3$/gm), and is marketed under the tradenames of DAVISON 952 or DAVISON 955 by the Davison Chemical Division of W. R. Grace and Company, are particularly useful. In other embodiments, DAVIDSON 948 is used.

In some embodiments of this invention, the support material may be dry, that is, free of absorbed water. Drying of the support material can be achieved by heating or calcining at about 100° C. to about 1000° C., preferably, at least about 600° C. When the support material is silica, it is typically heated to at least 200° C., preferably, about 200° C. to about 850° C., and most preferably, at about 600° C.; and for a time of about 1 minute to about 100 hours, from about 12 hours to about 72 hours, or from about 24 hours to about 60 hours. The calcined support material, preferably, has at least some reactive hydroxyl (OH) groups.

In a particularly useful embodiment, the support material is fluorided. Fluoriding agent containing compounds may be any compound containing a fluorine atom. Particularly desirable are inorganic fluorine containing compounds are selected from the group consisting of $NH_4BF_4$, $(NH_4)_2SiF_6$, $NH_4PF_6$, $NH_4F$, $(NH_4)_2TaF_7$, $NH_4NbF_4$, $(NH_4)_2GeF_6$, $(NH_4)_2SmF_6$, $(NH_4)_2TiF_6$, $(NH_4)_2ZrF_6$, $MoF_6$, $ReF_6$, $GaF_3$, $SO_2ClF$, $F_2$, $SiF_4$, $SF_6$, $ClF_3$, $ClF_5$, $BrF_5$, $IF_7$, $NF_3$, $HF$, $BF_3$, $NHF_2$ and $NH_4HF_2$. Of these, ammonium hexafluorosilicate and ammonium tetrafluoroborate are useful. Combinations of these compounds may also be used.

Ammonium hexafluorosilicate and ammonium tetrafluoroborate fluorine compounds are typically solid particulates as are the silicon dioxide supports. A desirable method of treating the support with the fluorine compound is to dry mix the two components by simply blending at a concentration of from 0.01 to 10.0 millimole F/g of support, desirably in the range of from 0.05 to 6.0 millimole F/g of support, and most desirably in the range of from 0.1 to 3.0 millimole F/g of support. The fluorine compound can be dry mixed with the support either before or after charging to a vessel for dehydration or calcining the support. Accordingly, the fluorine concentration present on the support is in the range of from 0.1 to 25 wt %, alternately 0.19 to 19 wt %, alternately from 0.6 to 3.5 wt %, based upon the weight of the support.

The above two metal catalyst components described herein are generally deposited on the support material at a loading level of 10-100 micromoles of metal per gram of solid support; alternately 20-80 micromoles of metal per gram of solid support; or 40-60 micromoles of metal per gram of support. But greater or lesser values may be used provided that the total amount of solid complex does not exceed the support's pore volume.

Activators

The supported catalyst systems may be formed by combining the above two metal catalyst components with activators in any manner known from the literature including by supporting them for use in slurry or gas phase polymerization. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract a reactive, σ-bound, metal ligand making the metal compound cationic and providing a charge-balancing noncoordinating or weakly coordinating anion. Suitable activators for use in the processes described herein include any one or more of the activators described in PCT/US/2016/021757, the disclosure of which is hereby incorporated by reference in its entirety.

Scavengers

In some embodiments, the catalyst systems will additionally comprise one or more scavenging compounds. Here, the term "scavenger" means a compound that removes polar impurities from the reaction environment. These impurities adversely affect catalyst activity and stability. Typically, the scavenging compound will be an organometallic compound such as the Group-13 organometallic compounds of U.S. Pat. Nos. 5,153,157; 5,241,025; and WO 91/09882; WO 94/03506; WO 93/14132; and that of WO 95/07941. Exemplary compounds include triethyl aluminum, triethyl borane, tri-iso-butyl aluminum, methyl alumoxane, iso-butyl alumoxane, and tri-n-octyl aluminum. Those scavenging compounds having bulky or $C_6$-$C_{20}$ linear hydrocarbyl substituents connected to the metal or metalloid center usually minimize adverse interaction with the active catalyst. Examples include triethyl aluminum, but more preferably, bulky compounds such as tri-iso-butyl aluminum, tri-isoprenyl aluminum, and long-chain linear alkyl-substituted aluminum compounds, such as tri-n-hexyl aluminum, tri-n-octyl aluminum, or tri-n-dodecyl aluminum. When alumoxane is used as the activator, any excess over that needed for activation will scavenge impurities and additional scavenging compounds may be unnecessary. Alumoxanes also may be added in scavenging quantities with other activators, e.g., methylalumoxane, $[Me_2HNPh]^+[B(pfp)_4]^-$ or $B(pfp)_3$ (perfluorophenyl=pfp=$C_6F_5$).

Preferred aluminum scavengers useful in the invention include those where there is oxygen present. That is, the material per se or the aluminum mixture used as a scavenger, includes an aluminum/oxygen species, such as an alumoxane or alkylaluminum oxides, e.g., dialkylaluminum oxides, such as bis(diisobutylaluminum) oxide. In one aspect, aluminum containing scavengers can be represented by the formula $((R_z—Al—)_yO—)_x$, wherein z is 1-2, y is 1-2, x is 1-100, and R is a $C_1$-$C_{12}$ hydrocarbyl group. In another aspect, the scavenger has an oxygen to aluminum (O/Al) molar ratio of from about 0.25 to about 1.5, more particularly from about 0.5 to about 1.

Polymerization Process

In embodiments herein, the invention relates to polymerization processes where monomer (such as ethylene), and, optionally, comonomer (such as hexene), are contacted with a supported catalyst system comprising a pyridyldiamido transition metal complex, a metallocene compound, an activator and a support material as described above.

Monomers useful herein include substituted or unsubstituted $C_2$ to $C_{40}$ alpha olefins, preferably, $C_2$ to $C_{20}$ alpha olefins, preferably, $C_2$ to $C_{12}$ alpha olefins, preferably, ethylene, propylene, butene, pentene, hexene, heptene, octene, nonene, decene, undecene, dodecene and isomers thereof. In a preferred embodiment of the invention, the monomers comprise ethylene and, optional, comonomers comprising one or more $C_3$ to $C_{40}$ olefins, preferably, $C_4$ to $C_{20}$ olefins, or preferably, $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may, optionally, include heteroatoms and/or one or more functional groups.

Exemplary $C_3$ to $C_{40}$ comonomers include propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably, hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives.

In a preferred embodiment one or more dienes are present in the polymer produced herein at up to 10 wt %, preferably, at 0.00001 to 1.0 wt %, preferably, 0.002 to 0.5 wt %, even more preferably, 0.003 to 0.2 wt %, based upon the total weight of the composition. In some embodiments 500 ppm or less of diene is added to the polymerization, preferably, 400 ppm or less, preferably, or 300 ppm or less. In other embodiments, at least 50 ppm of diene is added to the polymerization, or 100 ppm or more, or 150 ppm or more.

Preferred diolefin monomers useful in this invention include any hydrocarbon structure, preferably, $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e., di-vinyl monomers). More preferably, the diolefin monomers are linear di-vinyl monomers, most preferably, those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a particularly preferred embodiment the process of the invention relates to the polymerization of ethylene and at least one comonomer having from 3 to 8 carbon atoms, preferably, 4 to 8 carbon atoms. Particularly, the comonomers are propylene, 1-butene, 4-methyl-1-pentene, 3-methyl-1-pentene, 1-hexene and 1-octene, the most preferred being 1-hexene, 1-butene and 1-octene.

Polymerization processes of this invention can be carried out in any manner known in the art. Any suspension, homogeneous, bulk, solution, slurry, or gas phase polymerization process known in the art can be used. Such processes can be run in a batch, semi-batch, or continuous mode. Gas phase polymerization processes and slurry processes are preferred. (A homogeneous polymerization process is defined to be a process where at least 90 wt % of the product is soluble in the reaction media.) A bulk homogeneous process is particularly preferred. (A bulk process is defined to be a process where monomer concentration in all feeds to the reactor is 70 volume % or more.) Alternately, no solvent or diluent is present or added in the reaction medium, (except for the small amounts used as the carrier for the catalyst system or other additives, or amounts typically found with the monomer; e.g., propane in propylene). In another embodiment, the process is a slurry process. As used herein, the term "slurry polymerization process" means a polymerization process where a supported catalyst is employed and monomers are polymerized on the supported catalyst particles. At least 95 wt % of polymer products derived from the supported catalyst are in granular form as solid particles (not dissolved in the diluent).

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. Suitable solvents also include liquid olefins, which may act as monomers or comonomers, including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably, aromatics are present in the solvent at less than 1 wt %, preferably, less than 0.5 wt %, preferably, less than 0 wt % based upon the weight of the solvents.

In a preferred embodiment, the feed concentration of the monomers and comonomers for the polymerization is 60 vol % solvent or less, preferably, 40 vol % or less, or preferably, 20 vol % or less, based on the total volume of the feedstream. Preferably, the polymerization is run in a bulk process.

Preferred polymerizations can be run at any temperature and/or pressure suitable to obtain the desired polymers. The present polymerization processes may be conducted under conditions, preferably, including a temperature of about 30° C. to about 200° C., preferably, from 60° C. to 195° C., preferably, from 75° C. to 190° C. The process may be conducted at a pressure of from 0.05 MPa to 1500 MPa. In a preferred embodiment, the pressure is between 1.7 MPa and 30 MPa, or in another embodiment, especially under supercritical conditions, the pressure is between 15 MPa and 1,500 MPa.

In a typical polymerization, the run time of the reaction is up to 300 minutes, preferably, in the range of from about 5 to 250 minutes, or preferably, from about 10 to 120 minutes.

In some embodiments hydrogen is present in the polymerization reactor at a partial pressure of 0.001 to 50 psig (0.007 to 345 kPa), preferably, from 0.01 to 25 psig (0.07 to 172 kPa), more preferably, 0.1 to 10 psig (0.7 to 70 kPa).

In an alternate embodiment, the activity of the catalyst is at least 50 g/mmol/hour, preferably, 500 or more g/mmol/hour, preferably, 5,000 or more g/mmol/hr, preferably, 50,000 or more g/mmol/hr. In an alternate embodiment, the conversion of olefin monomer is at least 10%, based upon polymer yield and the weight of the monomer entering the reaction zone, preferably, 20% or more, preferably, 30% or more, preferably, 50% or more, preferably, 80% or more.

In a preferred embodiment, little or no scavenger is used in the process to produce the ethylene polymer. Preferably, scavenger (such as tri-alkyl aluminum) is present at zero mol %, alternately the scavenger is present at a molar ratio of scavenger metal to transition metal of less than 100:1, preferably, less than 50:1, preferably, less than 15:1, preferably, less than 10:1.

In a preferred embodiment, the polymerization: 1) is conducted at temperatures of 0 to 300° C. (preferably, 25 to 150° C., preferably, 40 to 120° C., preferably, 45 to 85° C.); 2) is conducted at a pressure of atmospheric pressure to 10 MPa (preferably, 0.35 to 10 MPa, preferably, from 0.45 to 6 MPa, preferably, from 0.5 to 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; preferably, where aromatics are preferably, present in the solvent at less than 1 wt %, preferably, less than 0.5 wt %, preferably, at 0 wt % based upon the weight of the solvents); 4) the polymerization preferably, occurs in one reaction zone; and 5), optionally, hydrogen is present in the polymerization reactor at a partial pressure of 0.001 to 50 psig (0.007 to 345 kPa) (preferably, from 0.01 to 25 psig (0.07 to 172 kPa), more preferably, 0.1 to 10 psig (0.7 to 70 kPa)).

A "reaction zone" also referred to as a "polymerization zone" is a vessel where polymerization takes place, for example, a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In a preferred embodiment, the polymerization occurs in one reaction zone. Room temperature is 23° C. unless otherwise noted.

Gas Phase Polymerization

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.)

Slurry Phase Polymerization

A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension, including diluent, is intermittently or continuously removed from the reactor where the volatile components are separated from the polymer and recycled, optionally, after a distillation, to the reactor. The liquid diluent employed in the polymerization medium is typically an alkane having from 3 to 7 carbon atoms, preferably, a branched alkane. The medium employed should be liquid under the conditions of polymerization and relatively inert. When a propane medium is used the process must be operated above the reaction diluent critical temperature and pressure. Preferably, a hexane or an isobutane medium is employed.

In an embodiment, a preferred polymerization technique useful in the invention is referred to as a particle form polymerization, or a slurry process where the temperature is kept below the temperature at which the polymer goes into solution. Such technique is well known in the art, and described in, for instance, U.S. Pat. No. 3,248,179; which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

The reactor may be maintained at a pressure of 3620 kPa to 4309 kPa and at a temperature in the range of about 60° C. to about 104° C. depending on the desired polymer melting characteristics. Reaction heat is removed through the loop wall since much of the reactor is in the form of a double-jacketed pipe. The slurry is allowed to exit the reactor at regular intervals or continuously to a heated low pressure flash vessel, rotary dryer and a nitrogen purge column in sequence for removal of the isobutane diluent and all unreacted monomer and comonomers. The resulting hydrocarbon free powder is then compounded for use in various applications.

Other additives may also be used in the polymerization, as desired, such as one or more scavengers, promoters, modifiers, chain transfer agents (such as diethyl zinc), reducing agents, oxidizing agents, aluminum alkyls, or silanes.

End Uses

The multimodal polyolefin produced by the processes disclosed herein and blends thereof are useful in such forming operations as film, sheet, and fiber extrusion and co-extrusion as well as blow molding, injection molding, and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc., in food-contact and non-food contact applications. Fibers include melt spinning, solution spinning and melt blown fiber operations for use in woven or nonwoven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Methods of Measurement

Molecular Weight and Comonomer Composition and Distribution

Molecular weight (e.g., Mw, Mn, MWD) and comonomer composition and distribution are determined via high temperature Gel Permeation Chromatography (GPC), using a Polymer Char GPC-IR and Polymer Char GPC One version 2013g data-processing program equipped with a multiple-channel band filter based Infrared detector ensemble IR5. A broad-band channel is used to measure the polymer concentration while two narrow-band channels are used for characterizing composition. Three Agilent PLgel 10 μm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1 μm Teflon filter and degassed with an online degasser before entering the GPC instrument. The nominal flow rate is 1.0 mL/min and the nominal injection volume is 200 μL. The entire system, including transfer lines, columns, and detectors, are contained in an oven maintained at 145° C. A given amount of polymer sample is weighed and sealed in a standard vial with 80 μL of flow marker (heptane) added to it. After loading the vial in the autosampler, polymer is automatically dissolved in the instrument with 8 mL added TCB solvent. The polymer is dissolved at 160° C. with continuous shaking for about one hour for polyethylene samples. The TCB densities used in the concentration calculation are 1.463 g/ml at room temperature and 1.284 g/ml at 145° C. The sample solution concentration is from 0.2 to 2.0 mg/ml, with lower concentrations being used for higher molecular weight samples.

The concentration, c, at each point in the chromatogram is calculated from the baseline-subtracted IR5 broadband signal, I, using the equation c=αI, where α is the mass constant determined for polyethylene. The mass recovery is calculated from the ratio of the integrated area of the concentration chromatography over elution volume and the injection mass which is equal to the pre-determined concentration multiplied by injection loop volume.

The molecular weight is determined by combining the universal calibration relationship with the column calibration, which is performed with a series of monodispersed polystyrene (PS) standards. The MW is calculated at each elution volume with following equation:

$$\log M_X = \frac{\log(K_{PS}/K_X)}{a_X + 1} + \frac{a_{PS} + 1}{a_X + 1}\log M_{PS}$$

where the variables with subscript "X" stand for the test sample while those with subscript "PS" stand for PS. In this method, $a_{PS}=0.67$ and $K_{PS}=0.000175$ while $a_X$ and $K_X$ are obtained from published literature. Specifically, a/K=0.695/0.000579 for polyethylene.

The comonomer composition is determined by the ratio of the IR detector intensity corresponding to the $CH_3$ and $CH_2$ channels calibrated with a series of polyethylene and polypropylene homo/copolymer standards whose nominal value are predetermined by NMR or FTIR. In particular, this provides the methyl ($CH_3$) per 1000 total carbons (1000TC), denoted as $CH_3/1000TC$, as a function of molecular weight. The short-chain branch (SCB) content per 1000TC, denoted as SCB/1000TC, is then computed as a function of molecular weight by applying a chain-end correction to the $CH_3/1000TC$ function, assuming each chain to be linear and terminated by a methyl group at each end. The wt % comonomer is then obtained from the following expression in which f is 0.3, 0.4, 0.6, 0.8, etc. for $C_3$, $C_4$, $C_6$, $C_8$, etc. co-monomers, respectively:

$$w2 = f * SCB/1000TC$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained:

$$\text{Bulk IR Ratio} = \frac{\text{Area of } CH_3 \text{ signal within integration limits}}{\text{Area of } CH_3 \text{ signal within integration limits}}$$

Then the same calibration of the $CH_3$ and $CH_2$ signal ratio, as mentioned previously in obtaining the $CH_3/1000TC$ as a function of molecular weight, is applied to obtain the bulk $CH_3/1000TC$. The bulk $CH_3/1000TC$ is converted into bulk SCB/1000TC and then converted to w2 in the same manner as described above.

Small Angle Oscillatory Shear (SAOS)

SAOS experiments were performed at 190° C. using a 25 mm parallel plate configuration on an MCR501 rotational rheometer (Anton Paar GmbH). Sample test disks (25 mm diameter, 15 mm thickness) were made with a Carver Laboratory press at 190° C. Samples were allowed to sit without pressure for approximately 3 minutes in order to melt and then held under pressure typically for 3 minutes to compression mold the sample. The disk sample was first equilibrated at 190° C. for about 10 minutes between the parallel plates in the rheometer to erase any prior thermal and crystallization history. An angular frequency sweep was next performed with a typical gap of 1.9 mm from 500 rad/s to 0.01 rad/s angular frequency using 5 points/decade and a strain value within the linear viscoelastic region determined from strain sweep experiments (see C. W. Macosko, *Rheology Principles, Measurements and Applications*, Wiley-VCH, New York, 1994). All experiments were performed in a nitrogen atmosphere to minimize any degradation of the sample during the rheological testing.

From the storage (G') and loss (G") dynamic moduli (see C. W. Macosko, *Rheology Principles, Measurements and Applications*, Wiley-VCH, New York, 1994), the loss tangent (tan δ), where δ is the phase (loss) angle which is a measure of melt elasticity, is defined for each angular frequency as follows:

$$\tan\delta = \frac{G''}{G'}$$

A van Gurp-Palmen plot (vG-P plot), as described in the reference, van Gurp, M., Palmen, J., "Time Temperature Superposition for Polymeric Blends," Rheol. Bull. (1998) 67(1): pp. 5-8 (Public of Soc. of Rheol.), is a plot of the measured phase angle δ, as defined in the above equation for tan δ, versus the complex shear modulus, |G*(ω)|, which is calculated for each angular frequency, ω, according to the following equation:

$$|G^*(\omega)| = (G'^2 + G''^2)^{1/2}$$

The norm of the complex viscosity |η*|, also simply referred to as complex viscosity η*, is calculated from G' and G" as a function of frequency ω as follows (see C. W. Macosko, *Rheology Principles, Measurements and Applications*, Wiley-VCH, New York, 1994):

$$|\eta*(\omega)| \equiv \eta*(\omega) = \frac{(G'^2 + G''^2)^{1/2}}{\omega}$$

A vG-P plot can be used to extract information on the molecular characteristics of a polymer, e.g., linear versus long chain branched chains, type of long chain branching, polydispersity, etc. (see Dealy, M. J., Larson, R. G., "Structure and Rheology of Molten Polymers", Carl Hanser Verlag, Munich 2006, pp. 182-183). It has been proposed that a vGP-plot can be used to characterize the polydispersity of a linear polymer (See Trinkle, S., Friedrich, C., "van Gurp-Palmen Plot: A Way to Characterize Polydispersity of LinearPolymers," Rheol. Acta 40, pp. 322-328, 2001). It has also been suggested that a vGP-plot can be used to reveal the presence of long chain branching in polyethylene (See Trinkle, S., Walter, P., Friedrich, C., "van Gurp-Palmen Plot II—Classification of Long Chain Branched Polymers by Their Topology," Rheol. Acta 41, pp. 103-113, 2002).

Extensional Rheometry

Extensional rheometry was performed on an Anton-Paar MCR 501 or TA Instruments DHR-3 using a SER Universal Testing Platform (Xpansion Instruments, LLC), model SER2-P or SER3-G. The SER (Sentmanat Extensional Rheometer) Testing Platform is described in U.S. Pat. Nos. 6,578,413 and 6,691,569. A general description of transient uniaxial extensional viscosity measurements is provided, for example, in "Strain Hardening of Various Polyolefins in Uniaxial Elongational low," 47(3) The Society of Rheology, Inc., J. Rheol., 619-630 (2003) and "Measuring the Transient Extensional Rheology of Polyethylene Melts Using the SER Universal Testing Platform," 49(3) The Society of Rheology, Inc., J. Rheol., 585-606 (2005). The SER instrument consists of paired master and secondary windup drums mounted on bearings housed within a chassis and mechanically coupled via intermeshing gears. Rotation of the drive shaft results in a rotation of the affixed master drum and an equal but opposite rotation of the secondary drum, which stretches the sample. The sample is usually mounted to the drums via securing clamps. Rectangular sample specimens with dimensions of approximately 18.0 mm long×12.70 mm wide are mounted on the SER fixture. The specimen thickness is typically 0.5-1 mm and the testing temperature is 150° C. Samples are generally tested at four different Hencky strain rates: 0.01 $s^{-1}$, 0.1 $s^{-1}$, 1 and 10 $s^{-1}$. The polymer samples are prepared by hot pressing at 190° C. with a Carver Laboratory press and equilibrated at 150° C. for 5 minutes after being mounted.

In addition to the extensional (SER) test, 25 mm disk samples are also tested using start-up of steady shear experiments with a parallel plate configuration at vanishing small shear rates, typically 0.01-0.05 $s^{-1}$. This provides the linear viscoelastic envelope (LVE), defined as 3 times the value of the LVE shear stress growth coefficient as a function of strain, as described in "Measuring the Transient Extensional Rheology of Polyethylene Melts Using the SER Universal Testing Platform," 49(3) The Society of Rheology, Inc., J. Rheol., 585-606 (2005). Generally, the low-strain transient extensional data for all Hencky strain rates tends to collapse (see "Crystallization of an Ethylene-Based Butane Plastomer: The Effect of Uniaxial Extension", Rheol. Acta., 49:931-939, 2010). Strain hardening occurs when a polymer is subjected to uniaxial extension and the transient extensional viscosity increases more than what is predicted from linear viscoelastic theory. Strain hardening is observed as abrupt upswing of the extensional viscosity relatively to LVE in the tensile stress growth coefficient versus time or strain plot. A strain hardening ratio (SHR) is used to characterize the deviation/increase in extensional viscosity relative to LVE and is defined as the ratio of the maximum tensile stress growth coefficient before specimen rupture/breakage over 3 times the value of the LVE shear stress growth at the same strain, where strain is the time multiplied by the Hencky strain rate. Strain hardening is present in the melt at a given strain rate when SHR is greater than 1 at that strain rate.

Melt Strength

Melt strength is measured with a RHEOTENS device, Model 71-97, in combination with the capillary rheometer, model Rheotester 1000, both manufactured by Goettfert. In the RHEOTENS test, the tensile (or equivalent pull-off) force required for extension/stretching of an extruded melt filament exiting a capillary die is measured as a function of the wheel take-up velocity that increases continuously at a constant acceleration speed. The tensile force typically increases as the wheel velocity is increased, and above a certain take-up velocity the force remain constant until the filament breaks. The testing conditions are as follows:

Capillary Rheometer (Rheotester 1000): die diameter: 2 mm; die length over diameter (L/D): 30/2; die temperature: 190° C.; piston speed: 0.278 mm/s; apparent die wall shear rate: 40.1 $s^{-1}$.

Strand: length: 100 mm; velocity at the die exit: 10 mm/s.

RHEOTENS Model 71-97: Wheel gap: ~0.7 mm (adjusted depending on extrudate swell); wheels: grooved; wheel acceleration speed: 2.4 mm/$s^2$.

For each material, several RHEOTENS curves are generate to verify data reproducibility. Once the strand is placed between the wheels, the wheel speed is adjusted until a force 0 is measured. This beginning speed, Vs, is the speed of the strand through the nip of the wheels at the start of the test. Once the test is started, the speed of the wheels is increased with a 2.4 mm/$s^2$ acceleration and the tensile (pull-off) force is measured for each given speed. After each strand break, or strand slip between the wheels, the measurement is stopped and the material is placed back between the wheels for a new measurement. A new RHEOTENS curve is recorded, and measuring continues until all material in the barrel is consumed.

The average of the tensile force versus draw ratio for each material is reported herein. Draw ratio is defined as the ratio of the wheel take-up velocity over the velocity of the filament at the die exit, determined from the mass balance using the mass throughput of the melt exiting the die, the cross-sectional of the die without taking into account the extrudate swell, and assuming a melt density of 0.76 g/$cm^3$), e.g., see Equation (1) of the reference "Simulation of Melt Spinning Including Flow-Induced Crystallization Part I: Model Development and Predictions," J. Non-Newtonian Fluid Mech. 92, pp. 27-66, 2000. Melt strength is defined as the average tensile force (N or cN) corresponding to the horizontal-like (plateau) portion of the RHEOTENS curve before unsteady force oscillation and/or filament rupture/breakage (see "Shear and Extensional Rheology of Polymer Melts: Experimental and Modeling Studies," J. Rheol. 55 (2011), pp. 95-126). In cases where no plateau is observed in the tensile force versus take-up velocity curve, the melt strength is defined here as the maximum tensile force just before filament slip between the wheels and/or filament rupture/breakage.

X-Ray Scattering (WAXS/SAXS)

Figure 4:
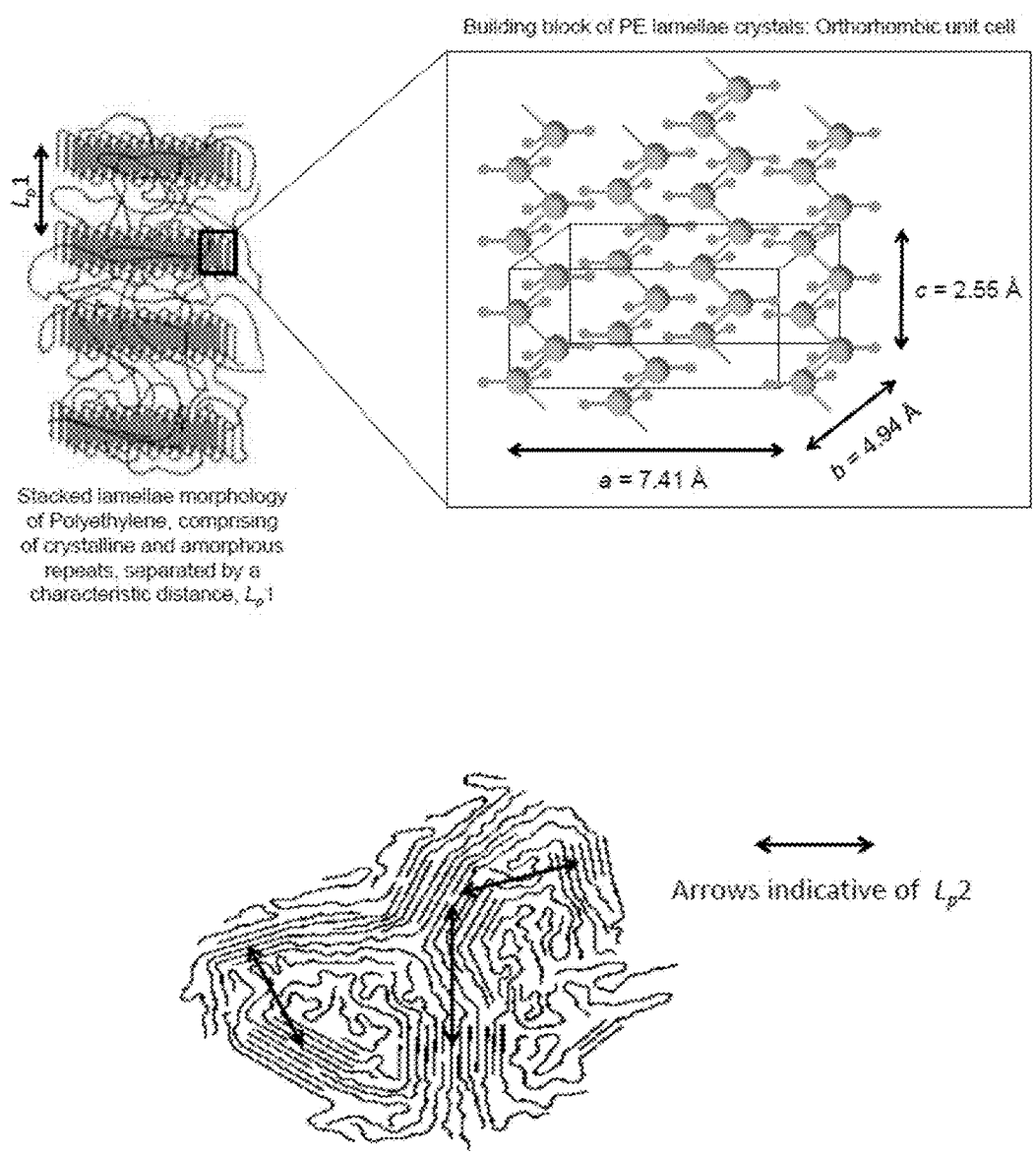
FIG. 4 is a schematic depiction of polyethylene crystallography with demonstration of inter-crystalline spacing Lp1, Lp2 determined via SAXS.

Polyethylene morphology is probed using X-ray scattering methods. Since polyethylene is a semi-crystalline polymer, the crystal structure can be resolved using X-ray diffraction (XRD) or Wide-Angle X-ray Scattering (WAXS). The unit cells of the crystalline polymer are the building blocks of the crystalline lamellae: planar sheets of crystalline material (FIG. 4). Since not all polymer chains can crystallize, amorphous chains also exist and these typically are found in between stacks of crystalline lamellae. WAXS can probe the extent to which these polymer chains crystallize since the data will contain information regarding crystalline and amorphous morphology. WAXS also can determine crystalline orientation and crystallite size. The characteristic repeat distance of the stacked lamellae (long period, Lp, or "inter-crystalline lamellae distances") are determined from Small-Angle X-ray Scattering (SAXS) methods, since the length scales that can be probed by SAXS (3 nm to ~150 nm) are in the region consistent with typical values for lamellae stacking of polyethylene. SAXS can also determine primary and secondary crystalline regions from different values of Lp, which are determined by the maximum intensity values of a peak in an Intensity vs Scattering Angle plot. Lp1 is the domain spacing between adjacent crystallites in primary crystals comprised of stacked lamellae (see FIG. 4). Lp2 is the domain spacing between crystallites in secondary crystals that crystallize at significantly lower temperatures than primary crystallites (see FIG. 4). Generally, primary crystallites will form from the molecules of least comonomer content (i.e., high density molecules). Secondary crystallites will generally form from the molecules that contain the highest comonomer content (i.e., lower density molecules). Co-monomer introduces short chain branching (e.g., hexane introduces butyl short chain branches into the ethylene chain) preventing chain folding and slowing down crystallization.

All small- and wide-angle X-ray scattering (SAXS/WAXS) were performed using an in-house SAXSLAB Ganesha 300XL+. Polymer pellet samples were melt pressed into discs approximately 0.5 mm thick from a melt of 190° C. Samples were cooled overnight in air and then placed directly in the path of the incident X-ray beam. The incident wavelength was 0.154 nm from a CuKα microfocus sealed tube source (Xenocs). All samples were collected at sample-to-detector positions of 91 mm (WAXS) and 1041 mm (SAXS) and were held in a vacuum to minimize air scatter. The SAXS and WAXS were recorded using a Dectris Pilatus.

Sample to detector distance was calibrated using a Silver Behenate standard. A 0-360 integration was performed on the 2D scattering patterns. The Intensities were recorded as a function of scattering vector, q, where $q=4\pi \sin\theta/\lambda$ ($\theta$ is the scattering angle and $\lambda$ is the incident wavelength) and the scattering vector q is also defined as $q=2\pi/d$ where d is a distance in real space: unit cell dimension from WAXS, and inter-lamellae spacing from SAXS. All data were corrected for transmission, background scattering and detector non-linearity.

The crystallinity of the film samples is obtained from WAXS: unit cell type and overall extent of crystallinity. WAXS and SAXS patterns were collapsed to a I(q) vs q plot. The overall degree of crystallinity of the film samples was determined by taking the ratio of the peak areas of the (110) and (200) reflections (which were fit to a Gaussian function) to the total area underneath the 1D WAXS profile[1]. The amorphous region was also fit to a Gaussian curve. SAXS patterns were collapsed to 1D following the same protocol, and the intensity was multiplied by q2 to correct for the lamellae shape (a Lorentz correction [2]). This provides information pertaining to the structure and inter-lamellae spacing.

See [1] Akpalu, Y., et al., "Structure Development During Crystallization of Homogeneous Copolymers of Ethene and 1-Octene: Time-Resolved Synchrotron X-ray and SALS Measurements," Macromolecules 32(3): p. 765-770, 1999; and [2] F. Cser, "About the Lorentz Correction Used in the Interpretation of SAXS Data of Semicrystalline Polymers," Journal of Polymer Science Part B-Polymer Physics, 29, p. 1235-1254, 1999.

EXAMPLES

General Synthesis of Pyridyldiamines

Outlined in Scheme 1 is the general synthetic route that was used to prepare the pyridyldiamines used herein. In the Scheme, pin is pinacolate (2,3-dimethylbutane-2,3-diolate), Me is methyl, and Dipp is 2,6-diisopropylphenyl. A detailed procedure is presented for the preparation of a pyridyldiamine designated as 6a herein.

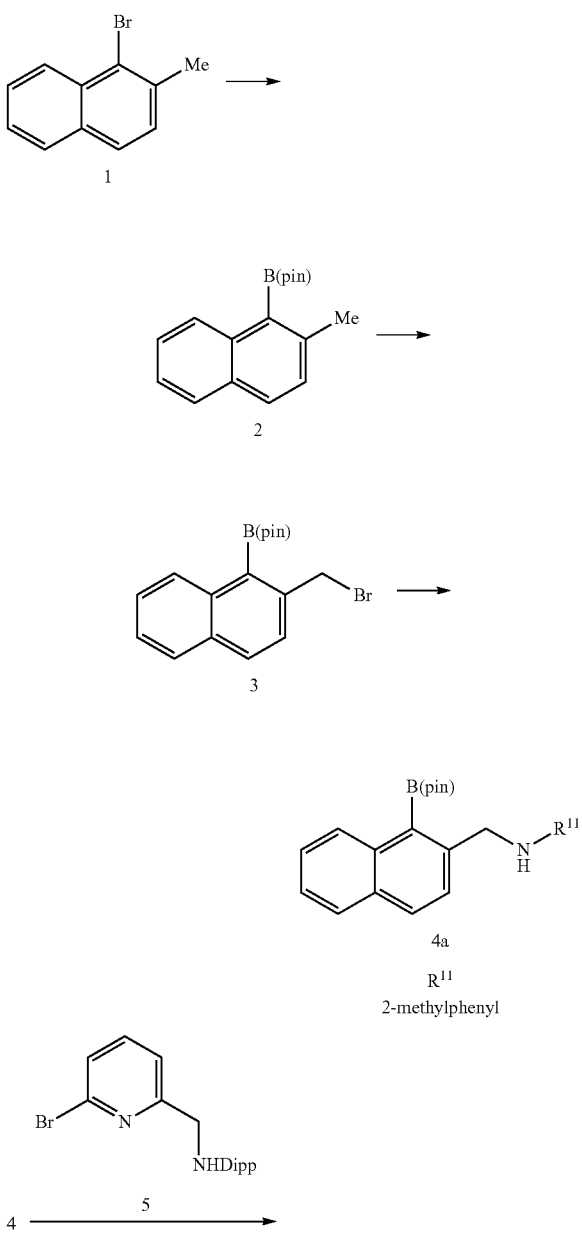

Scheme 1. Overview of pyridyldiamine synthesis route.

-continued

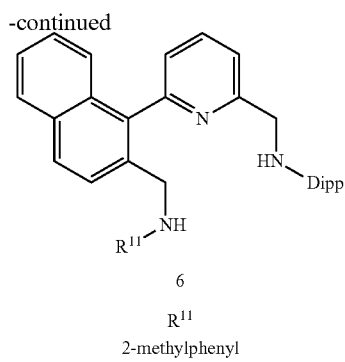

R[11]
2-methylphenyl

4,4,5,5-Tetramethyl-2-(2-methyl-1-naphthyl)-1,3,2-dioxaborolane (2)

1,2-Dibromoethane (~0.3 ml) was added to 6.10 g (250 mmol) magnesium turnings in 1000 cm³ of THF. This mixture was stirred for 10 min, and then 55.3 g (250 mmol) of 1-bromo-2-methylnaphthalene was added for 1 h by vigorous stirring at room temperature for 3.5 hours. Thereafter, 46.5 g (250 mmol) of 2-isopropoxy-4,4,5,5-tetramethyl-1,3,2-dioxaborolane was added in one portion. The resulting mixture was stirred for 15 minutes and then was poured into 1,000 cm³ of cold water. The product was extracted with 3×300 ml of ethyl acetate. The organic layer was separated, washed by water, brine, then dried over $MgSO_4$, and, finally, evaporated to dryness. The resulting white solid was washed by 2×75 ml of pentane and dried in vacuum. Yield 47.3 g (70%). Anal. calc. for $C_{17}H_{21}BO_2$: C, 76.14; H, 7.89. Found: C, 76.31; H, 8.02. $^1H$ NMR ($CDCl_3$): 8.12 (m, 1H, 8-H), 7.77 (m, 1H, 5-H), 7.75 (d, J=8.4 Hz, 1H, 4-H), 7.44 (m, 1H, 7-H), 7.38 (m, 1H, 6-H), 7.28 (d, J=8.4 Hz, 1H, 3-H), 2.63 (s, 3H, 2-Me), 1.48 (s, 12H, $CMe_2CMe_2$).

2-[2-(Bromomethyl)-1-naphthyl]-4,4,5,5-tetramethyl-1,3,2-dioxaborolane (3)

A mixture of 47.3 g (176 mmol) of 4,4,5,5-tetramethyl-2-(2-methyl-1-naphthyl)-1,3,2-dioxaborolane, 33.0 g (185 mmol) of NBS (N-Bromosuccinimide) and 0.17 g of benzoyl peroxide in 340 ml of $CCl_4$ was stirred at 75° C. for 14 hours. Thereafter the reaction mixture was cooled to room temperature, filtered through glass frit (G3), and the filtrate was evaporated to dryness. This procedure gave 62.2 g (99%) of beige solid. Anal. calc. for $C_{17}H_{20}BBrO_2$: C, 58.83; H, 5.81. Found: C, 59.00; H, 5.95. $^1H$ NMR ($CDCl_3$): 8.30 (m, 1H, 8-H), 7.84 (d, J=8.3 Hz, 1H, 4-H), 7.79 (m, 1H, 5-H), 7.43-7.52 (m, 3H, 3,6,7-H), 4.96 (s, 2H, $CH_2Br$), 1.51 (s, 12H, $CMe_2CMe_2$).

2-Methyl-N-((1-(4,4,5,5-tetramethyl-1,3,2-dioxaborolan-2-yl)naphthalen-2-yl)methyl)aniline (4a)

A mixture of 10.8 g (101 mmol) of 2-methylaniline, 23.3 g (67.0 mmol) of 2-[2-(bromomethyl)-1-naphthyl]-4,4,5,5-tetramethyl-1,3,2-dioxaborolane (compound 3), and 10.2 g (74.0 mmol) of $K_2CO_3$ in 450 mL of DMF was stirred for 12 h at 80° C. The resulting mixture was poured into 1000 mL of water. The product was extracted with 3×200 ml of ethyl acetate. The combined extract was dried over $MgSO_4$ and then evaporated to dryness. The residue was re-crystallized from a mixture of 200 ml of hexane and 10 ml of ethyl acetate. Yield 15.7 g (63%) of a brown crystalline powder. Anal. calc. for $C_{24}H_{28}BNO_2$: C, 77.22; H, 7.56; N, 3.75. Found: C, 77.33; H, 7.67; N, 3.59. $^1H$ NMR ($CDCl_3$): δ 8.20 (m, 1H, 8-H in naphthyl), 7.84 (d, J=8.5 Hz, 1H, 4-H in naphthyl), 7.82 (m, 1H, 5-H in naphthyl), 7.43-7.52 (m, 3H, 3,6,7-H in naphthyl), 7.14 (m, 1H, 5-H in o-tolyl), 7.06 (m, 1H, 3-H in o-tolyl), 6.79 (m, 1H, 6-H in o-tolyl), 6.68 (m, 1H, 4-H in o-tolyl), 4.53 (s, 2H, $CH_2N$), 3.95 (br.s, 1H, NH), 2.11 (s, 3H, 2-Me in o-tolyl), 1.36 (s, 12H, $CMe2CMe2$).

N-[(6-Bromopyridin-2-yl)methyl]-2,6-diisopropylaniline (5)

A mixture of 25.0 g (134 mmol) of 6-bromopyridine-2-carbaldehyde, 23.8 g (134 mmol) of 2,6-diisopropylaniline and 1.15 g (6.70 mmol) of TsOH in 600 ml of toluene was refluxed for 15 min using a Soxhlet apparatus filled with $CaCl_2$. The obtained solution was evaporated to dryness, and the residue was re-crystallized from 100 ml of methanol to give the imine product N-[(1E)-(6-bromopyridin-2-yl)methylene]-2,6-diisopropylaniline as a yellow crystalline solid (23.9 g). In argon atmosphere, a mixture of 22.4 g (65.0 mmol) of N-[(1E)-(6-bromopyridin-2-yl)methylene]-2,6-diisopropylaniline, 6.53 g (104 mmol) of $NaBH_3CN$, 2 ml of AcOH and 430 ml of methanol was refluxed for 12 h. The obtained mixture was cooled, poured into 1,000 ml of water, and then extracted with 3×200 ml of ethyl acetate. The combined extract was dried over $MgSO_4$ and evaporated to dryness. The residue was purified by flash chromatography on silica gel 60 (40-63 μm, eluent: hexane-ethyl acetate=10:1, vol.). Yield 19.8 g (43%) of a yellow oil. Anal. calc. for $C_{18}H_{23}BrN_2$: C, 62.25; H, 6.68; N, 8.07. Found: C, 62.40; H, 6.77; N, 7.96. $^1H$ NMR ($CDCl_3$): δ 7.50 (m, 1H, 4-H in 6-bromopyridyl), 7.38 (m, 1H, 5-H in 6-bromopyridyl), 7.28 (m, 1H, 3-H in 6-bromopyridyl), 7.01-7.11 (m, 3H, 3,4,5-H in 2,6-diisopropylphenyl), 4.16 (s, 2H, $CH_2N$), 3.93 (br.s, 1H, NH), 3.31 (sep, J=6.9 Hz, 2H, $CHMe_2$), 1.22 (d, J=6.9 Hz, 12H, $CHMe_2$).

2,6-Diisopropyl-N-{[6-(2-{[(2-methylphenyl)amino]methyl}-1-naphthyl)pyridin-2-yl]methyl}aniline (6a)

A mixture of 27.2 g (95.0 mmol) of $Na_2CO_3×10H_2O$, 410 ml of water and 120 ml of methanol was purged with argon for 30 min. The obtained solution was added to a mixture of 14.2 g (38.0 mmol) of 2-methyl-N-{[1-(4,4,5,5-tetramethyl-1,3,2-dioxaborolan-2-yl)-2-naphthyl]methyl}aniline (4a), 13.3 g (38.0 mmol) of N-[(6-bromopyridin-2-yl)methyl]-2,6-diisopropylaniline, and 2.19 g (1.90 mmol) of $Pd(PPh_3)_4$ in 500 ml of toluene. This mixture was stirred for 12 hours at 70° C., and then cooled to room temperature. The organic layer was separated; the aqueous layer was extracted with 3×200 ml of ethyl acetate. The combined organic extract was washed with brine, dried over $Na_2SO_4$ and evaporated to dryness. The residue was purified by flash chromatography on silica gel 60 (40-63 μm, eluent: hexane-ethyl acetate-triethylamine=100:20:1, vol.). Yield 10.1 g (52%) of a yellow powder. Anal. calc. for $C_{36}H_{39}N_3$: C, 84.17; H, 7.65; N, 8.18. Found: C, 84.28; H, 7.73; N, 8.09. $^1H$ NMR ($CDCl_3$): δ 7.91 (d, J=8.4 Hz, 1H, 4-H in naphthyl), 7.89 (m, 1H, 8-H in naphthyl), 7.79 (m, 1H, 4-H in Py), 7.66 (d, J=8.4 Hz, 1H, 3-H in naphthyl), 7.47 (m, 1H, 7-H in naphthyl), 7.36-7.42 (m, 4H, 3,5-H in Py and 5,6-H in naphthyl), 7.04-7.10 (m, 3H, 3,5-H in ortho-tolyl and 4-H in 2,6-diisopropylphenyl), 7.01 (m, 2H, 3,5-H in 2,6-diisopropylphenyl), 6.61 (m, 1H, 4-H in ortho-tolyl), 6.52 (m, 1H, 6-H in ortho-tolyl), 4.22-4.35 (m, 4H, CH$_2$N), 4.02 (br.s, 1H, NH), 3.93 (br.s, 1H, NH), 3.28 (sept, J=6.8 Hz, 2H, CHMe$_2$), 2.09 (s, 3H, Me in ortho-tolyl), 1.16 (d, J=6.8 Hz, 6H, CHMeMe'), 1.14 (d, J=6.8 Hz, 6H, CHMeMe').

Synthesis of Pyridyldiamide Metal Complexes

Scheme 2 below provides an outline of the general synthetic route to prepare pyridyldiamide complexes. A detailed synthesis is presented for the complex designated A1 herein. Other complexes may be prepared analogously to complex A1.

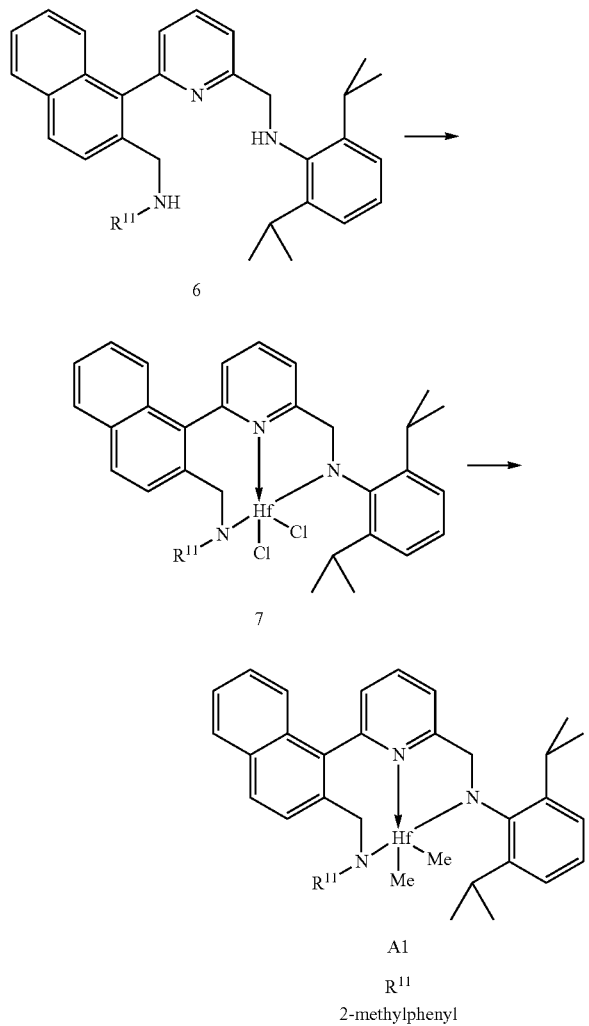

Scheme 2. Synthesis of Pyridyldiamide Complexes.

R$^{11}$ = 2-methylphenyl

Complex A1

Toluene (50 mL) was added to the pyridyldiamine 6a (2.07 g, 4.03 mmol) and Hf(NMe$_2$)$_2$Cl$_2$(dme) (dme=1,2-dimethoxyethane) (1.73 g, 4.03 mmol) to form a yellow solution. The mixture was heated to 95° C. in the dark. After 2.5 hours the suspension was cooled to ambient temperature for a couple of hours. The resulting solid was collected on a glass frit and washed with toluene (2×5 mL) and then dried under reduced pressure to afford 2.4 grams of the intermediate dichloride derivative as a white solid. Proton NMR spectroscopy indicated the presence of 0.46 equivalents of toluene. This dichloride derivative (2.40 g, 2.99 mmol) was combined with CH$_2$Cl$_2$ (100 mL) and cooled to −40° C. A solution of Me$_2$Mg (15.3 mL, 3.59 mmol) in Et$_2$O was added dropwise. After 0.5 h the mixture was allowed to warm to ambient temperature. The volatiles were then evaporated and the residue was extracted with CH$_2$Cl$_2$ and filtered. The volatiles were removed to afford the crude product that was washed with pentane. Drying under reduced pressure afforded product as a white solid (2.01 g, 93.3%). $^1$H NMR (400 MHz, CD$_2$Cl$_2$): 8.2-6.9 (aryls, 16H), 5.07 (AB quartet, Δv=130 Hz, J=20 Hz), 4.49 (br, 1H), 4.14 (br, 1H), 3.74 (sept, 1H), 3.02 (br sept 1H), 2.30 (br, 3H), 1.4-1.0 (m, 11H), 0.89 (t, 2H), 0.55 (d, 3H), −0.80 (s, 3H), −1.13 (s, 3H).

Preparation of Supported Catalyst Systems

The preparation process for a supported catalyst system comprising Complex A1 and bis(1-methyl-3-n-butylcyclopentadienyl)zirconium dichloride (designated as ECl$_2$ herein) is described below.

Preparation Supported Catalyst System I (Complex A1/(1,3-Me,nBuCp)$_2$ZrCl$_2$=1:3)

(i) Preparation of Combination of MAO/Silica (sMAO-D948-600° C.)

DAVIDSON 948 silica (45.5 g) calcined at 600° C. was slurried in 230 mL of toluene. MAO (79 g of a 30 wt % toluene solution, 351.1 mmol of Al) was added slowly to the slurry. The slurry was then heated to 80° C. and stirred for 1 hour. The slurry was filtered, washed three times with 70 mL of toluene and once with pentane. The solid was dried under vacuum overnight to give a 66.8 g of free flowing white solid.

(ii) Preparation of Supported Catalyst System I sMAO-D948-600° C. (66.8 g) was slurried in 200 mL of toluene. (1,3-Me,nBuCp)$_2$ZrCl$_2$ (867 mg, 2.00 mmol) and Complex A1 (507 mg, 0.668 mmol) were added together in a molar ratio of 3:1 into a vial and dissolved in 10 mL of toluene. The catalyst solution was added to the sMAO-D948-600° C. slurry. The catalyst vial was washed out with an additional 20 mL of toluene and added to the celstir. The catalyst stirred for 4 hours and 15 minutes. The slurry was filtered, washed three times with 60 mL of toluene and washed twice with pentane. The solid was dried under vacuum overnight to give a 69.6 g of a yellow powder.

Polymerization of Ethylene and Hexene

Polymerization was performed in a 7 foot tall gas-phase fluidized bed reactor with a 6 inch body and a 10 inch expanded section. Cycle and feed gases were fed into the reactor body through a perforated distributor plate, and the reactor was controlled at 300 psi and 70 mol % ethylene. Reactor temperature was maintained by heating the cycle gas. The supported catalyst was fed as a 10 wt % slurry in SONO JELL from Sonneborn (Parsippany, N.J.). Inventive Examples A and B used the Complex A1/ECl$_2$ catalyst system at a 1:3 molar ratio, and comparative Example C used a catalyst system having only the ECl$_2$ catalyst compound. The Complex A1/ECl$_2$ catalyst system at a 1:3 molar ratio required significantly more hydrogen in the reactor despite making a significantly lower melt index. These hydrogen requirements are the result of the high molecular weight capability of Complex A1. This catalyst system also shows better activity than ECl$_2$ catalyst alone despite significantly lower hexene levels in the reactor. The reactor process conditions and resulting granule properties are listed in Table 1 below.

TABLE 1

Polymerization Reactor Conditions and Granule Properties.

| | Inventive Example A | Inventive Example B | Comparative Example C |
|---|---|---|---|
| Temperature (° F.) | 185 | 185 | 85 |
| Pressure (psi) | 300 | 300 | 300 |
| Ethylene (mole %) | 69.8 | 69.9 | 70.0 |
| Hydrogen (ppm) | 420 | 399 | 175 |
| Hexene (mole %) | 0.32 | 0.59 | 1.58 |
| Bed Weight (g) | 2000 | 2900 | 2000 |
| Residence Time (hr) | 3.1 | 4.2 | 5.4 |
| Cycle Gas Velocity (ft/s) | 1.5 | 1.61 | 1.62 |
| Production Rate (g/hr) | 639 | 688 | 372 |
| Activity ($g_{poly}/g_{supported\ cat}$) | 3200 | 3600 | 1600 |
| Catalyst Slurry Feed (cc/hr) | 2.25 | 2.14 | 2.7 |
| MI I2.1 (g/10 min)* | — | — | 1.00 |
| MI I5 (g/10 min)* | 0.19 | 0.32 | — |
| HLMI I21 (g/10 min)* | 22.8 | 12.5 | 20.50 |
| MIR (I21/I2.1)* | — | — | 20.50 |
| Density (g/cm$^3$)* | 0.9489 | 0.9406 | 0.9186 |
| Bulk Density (g/cc) | 0.3668 | 0.4175 | 0.3419 |
| $N_2$ Cat. Probe Feed (cc/min) | 6000 | 6000 | 6000 |
| $iC_5$ Cat. Probe Feed (g/min)** | 1 | 1 | 1 |

*Data obtained from granules produced in the reactor by dry blending 0.06 wt % BHT stabilizer in a plastic bag via hand shaking/tumbling.
**$iC_5$ is isopentane, used as a condensing agent in the gas phase reactor.

Blending Components i and ii were also made with polymerization performed with $ECl_2$ catalyst in an 18.5 foot tall gas-phase fluidized bed reactor with a 10 foot body and an 8.5 foot expanded section. Cycle and feed gases were fed into the reactor body through a perforated distributor plate, and the reactor was controlled at 300 psi and 70 mol % ethylene. Reactor temperature was maintained by heating the cycle gas. The reactor conditions are and granule properties are summarized in Table 2 below. Blending Components i and ii are used in comparative Examples 5 and 6, as described further below.

TABLE 2

Polymerization Conditions and Properties for Blending Components i and ii.

| | Component i (100% $ECl_2$) | Component ii (100% $ECl_2$) |
|---|---|---|
| Temperature (° F.) | 185 | 185 |
| Pressure (psi) | 300 | 300 |
| Ethylene (mole %) | 70.0 | 70.0 |
| Hydrogen (ppm) | 20 | 312 |
| C2/C6 Mass Flow Ratio | 0.019 | 0.00 |
| Bed Weight (lb) | 283 | 285 |
| Residence Time (hr) | 3.1 | 3.1 |
| Cycle Gas Velocity (ft/s) | 1.90 | 1.90 |
| Activity ($g_{poly}/g_{supported\ cat}$) | 2200 | 1346 |
| MI I2.1 (g/10 min)* | 0.1 | 7.4 |
| HLMI I21 (g/10 min)* | 2.5 | 169 |
| MIR (I21/I2.1)* | 22 | 23 |
| Density (g/cm$^3$)* | 0.931 | 0.967 |

*Data obtained from granules produced in the reactor by dry blending 0.06 wt % BHT stabilizer in a plastic bag via hand shaking/tumbling.

Density data in Tables 1 and 2 was generated according to ASTM D1505-10 on molded specimens made from reactor granules according to ASTM D4703-10a with an accelerated conditioning of 2 hours at 23° C. before measurement.

Pellets were made from the polymer granules produced above using the extrusion process described further below, except for Comparative Examples 2, 3, and 4, which were already in pelletized form. Properties of the pelletized resin are provided in Table 3. Inventive Examples 1 and 2 in Table 3 used pellets produced from the polymer of Example A above. Comparative Example 3 is a pelletized bimodal, carbon black HDPE pressure pipe resin produced using BORSTAR technology, available from Borealis, and marketed as BORSAFE HE3490-LS. Comparative Example 4 is a pelletized high molecular weight HDPE blown film resin available from ExxonMobil Chemical Company, and marketed as HD 7960.13. Comparative Examples 5 and 6 are extruder melt blends of Blending Components, i and ii, made in the process described above (Table 2). Specifically, comparative Example 5 is a blend of 49 wt % Component i and 51 wt % Component ii. Comparative Example 6 is a blend of 60 wt % Component i and 50 wt % Component iii. Both comparative Examples 5 and 6 were pelletized using a twin screw extruder adding 0.06% wt % IRGANOX 1076 (primary antioxidant) and 1.2% wt % IRGAFOS 168 (secondary antioxidant) with the procedure described below.

TABLE 3

Properties for Pelletized Resins.

| Example | Resin* | Co-monomer | I2.16 (dg/min) | I5 (dg/min) | I21.6 (dg/min) | Density (g/cm$^3$) |
|---|---|---|---|---|---|---|
| 1 | BP18 Pellet of Example A | C6 | N/A | 0.60 | 17.3 | 0.950 |
| 2 | BP18 Pellet of Example A | C6 | 0.02 | 0.36 | 15.1 | 0.950 |
| 3 | BORSAFE HE3490-LS HDPE | C4 | 0.05 | 0.25 | 8.5 | 0.962 |
| 4 | HD7960.13 | C4 | 0.08 | 0.31 | 9.3 | 0.953 |
| 5 | $ECl_2$ Based BP18 Extruder Blend | C6 | 0.51 | 0.53 | 15.6 | 0.950 |
| 6 | $ECl_2$ Based BP18 Extruder Blend | C6 | 0.33 | 1.03 | 9.1 | 0.945 |

*BP18 refers to the 18 mm Baker Perkin twin screw extrusion process described below.

Density data in Table 3 was generated according to ASTM D1505-10 on molded specimens made from reactor granules according to ASTM D4703-10a with conditioning of 40 hours at 23° C. before measurement.

Twin Screw Extrusion Process

Reactor granules were extruded on an 18 mm Baker Perkin co-rotating twin screw extruder (abbreviated as BP 18) with a hopper/feeder system manufactured by Brandbender Technologie Inc, Canada. The granules were fed into the extruder feed throat through a volumentric feeder (Brandbender Technologie Inc). The maximum achievable screw speed was 500 rpm and the maximum motor horsepower was 3 hp. Unless otherwise indicated, reactor granules were dry blended with 0.06 wt % IRGANOX 1076 (primary antioxidant) and 1.2 wt % IRGAFOS 168 (secondary antioxidant). The extruder process conditions are listed in Tables 4. Melt Temperature in Table 4 was measured in the bulk of the melt with an infrared sensor at a location between the end of the screw and the die. A one-hole circular die was used, and the cylindrical strand was passed through a water bath and then entered into a Killion strand-cut pelletizer with a Bronco-II-160 Model motor control manufactured by Warner Electric. The mass throughput was determined in lbs/hr by collecting and weighing pellets exiting the pelletizer over a certain period of time (typically 2 minutes). The specific energy input (SEI) was estimated as follows:

$$SEI = 1.622 * (\% \text{ Torque}/100) * \frac{\text{Screw } rpm}{500} * \frac{P}{W}$$

where SEI is the specific energy input in kw-hr/kg, P is the extruder motor horsepower in hp (3 hp for the BP 18 extruder) and W is the mass throughput in lbs/hr. In this equation, 500 in the denominator represents the maximum achievable screw rpm for the BP 18 extruder and 1.622 is an approximate unit conversion factor.

TABLE 4

BP 18 Twin Screw Extruder Process Conditions.

| Extruder Process Conditions | Example 1 | Example 2 | Example 5 | Example 6 |
|---|---|---|---|---|
| Feed Zone Temperature (° F.) | 284 | 287 | 285 | 281 |
| Zone 2 Temperature (° F.) | 369 | 373 | 372 | 369 |
| Zone 3 Temperature (° F.) | 397 | 406 | 393 | 397 |
| Zone 4 Temperature (° F.) | 399 | 404 | 399 | 400 |
| Zone 5 Temperature (° F.) | 397 | 397 | 400 | 397 |
| Zone 6 Temperature (° F.) | 410 | 412 | 424 | 422 |
| Die Temperature (° F.) | 413 | 414 | 415 | 414 |
| Melt Temperature (° F.) | 435 | 434 | 437 | 436 |
| Screw Speed (rpm) | 200 | 200 | 200 | 200 |
| Feeder Setting | 200 | 200 | 200 | 200 |
| Throughput (lbs/hr) | 5.4 | 5.4 | 6.6 | 6.3 |
| % Torque | 54 | 59 | 69 | 80 |
| Die Pressure (psi) | 648 | 640 | 735 | 910 |
| Pelletizer Setting | 30/3 | 30/3 | 30/3 | 30/3 |
| Pellet MI (dg/min), 190 C./5 kg | 0.60 | 0.36 | 0.5 | 1.0 |
| Pellet MI (dg/min), 190 C./21.6 kg | 17.3 | 15.1 | 15.6 | 9.1 |
| Pellet MIR = MI21.6/MI5 | 28.8 | 42.0 | 29.5 | 8.8 |
| Estimated Specific Energy Input (SEI) (kw-hr/kg) | 0.195 | 0.213 | 0.203 | 0.247 |
| Die Pressure/Throughput (psi-hr/lb) | 120.0 | 118.5 | 111.4 | 144.4 |

Figure 2A:
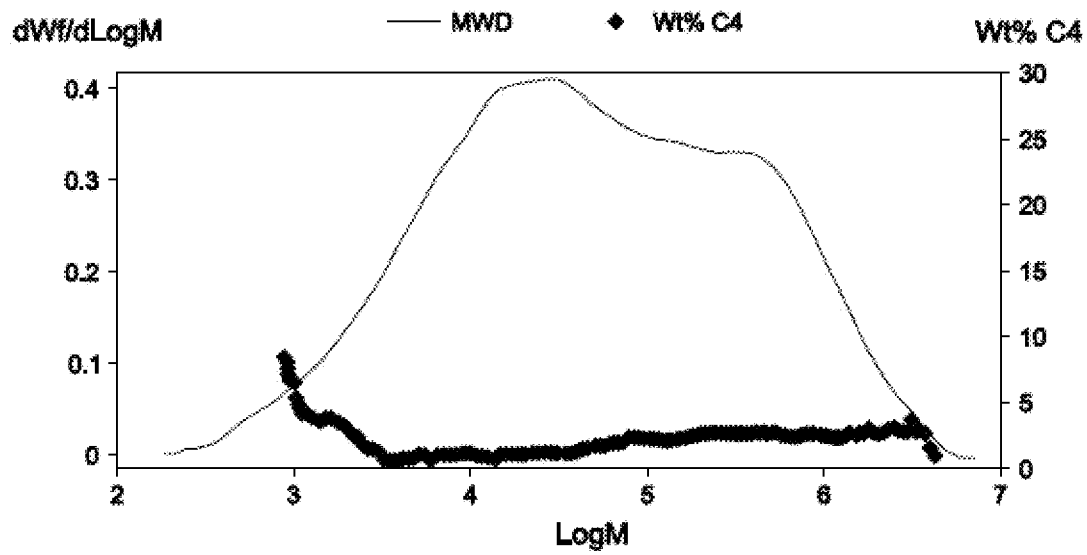
FIGS. 2a and 2b are GPC graphs showing molecular weight attributes for two comparative polyethylenes.
Figure 2B:
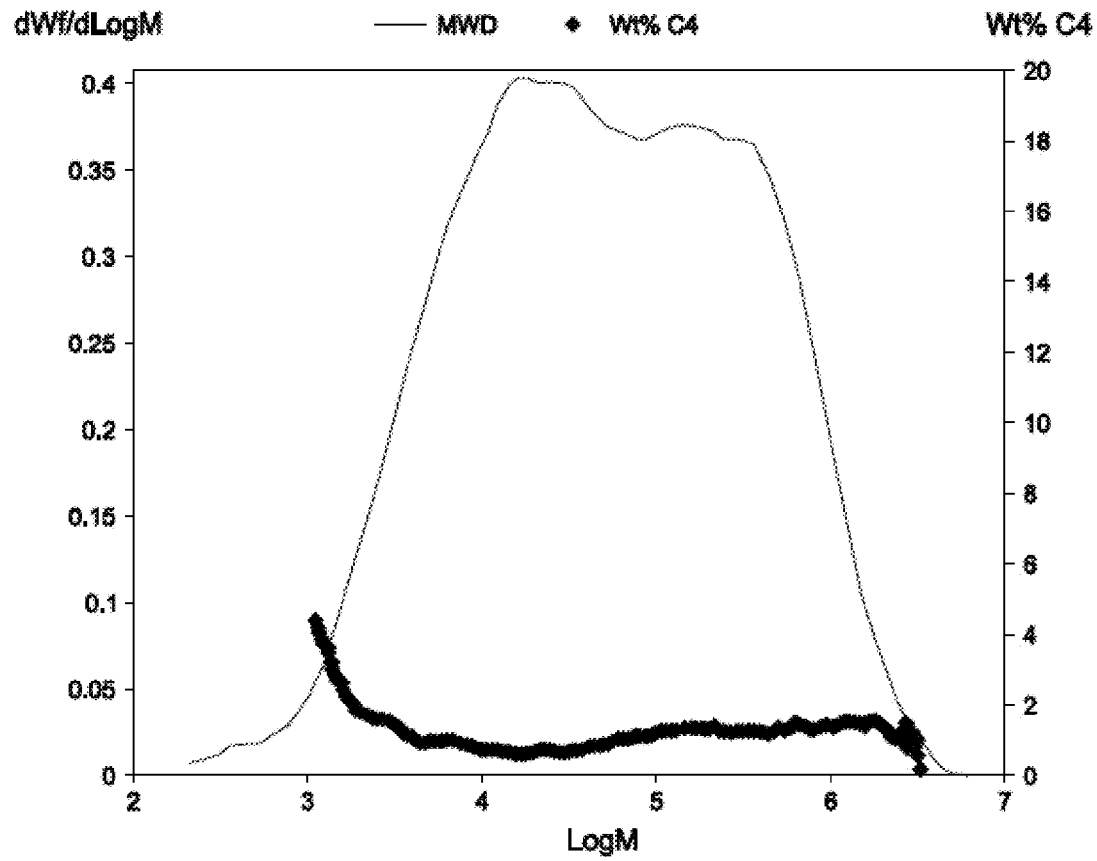

Table 5 below provides molecular weight and comonomer attributes for Examples 1-6. Additionally, FIG. 1 is a GPC-4D trace for the polyethylene of inventive Example 1, showing a clearly multimodal polymer having three inflection points on the molecular weight curve and a very broad molecular weight distribution. For comparison, FIGS. 2a and 2b provide GPC GPC-4D traces for comparative Examples 3 and 4, respectively.

TABLE 5

Molecular Weight and Comonomer Attributes.

| Example | Mw (kg/mol) | Mz (kg/mol) | Mw/Mn | Mz/Mw | % weight Co-Monomer by GPC-4D |
|---|---|---|---|---|---|
| 1 | 367.7 | 2599.2 | 56.3 | 7.1 | 2.8 |
| 2 | 317.2 | 2064.0 | 37.1 | 6.5 | 4.7 |
| 3 | 248.0 | 1283.9 | 29.6 | 5.2 | 1.9 |
| 4 | 217.6 | 1023.1 | 22.3 | 4.7 | 1.3 |
| 5 | 140.4 | 680.3 | 16.5 | 4.8 | 1.5 |
| 6 | 146.2 | 396.4 | 11.2 | 2.7 | 3.9 |

In Table 5, the % weight co-monomer was determined by GPC-4D according to the Bulk IR Ratio and subsequent analysis described herein.

Table 6 below provides rheological characteristics for Examples 1-6.

TABLE 6

Rheological Characteristics.

| Example | η * (0.01 rad/s)/ η * (0.18 rad/s) | η * (0.18 rad/s)/ η * (118 rad/s) | SHR @ 0.1 $s^{-1}$ Hencky strain rate | SHR @ 1 $s^{-1}$ Hencky strain rate | Melt Strength (cN) at 190° C. |
|---|---|---|---|---|---|
| 1 | 10.6 | 272.2 | 123.3 | 54.7 | 120.0 |
| 2 | 10.8 | 281.1 | 29.3 | 73.0 | 112.0 |
| 3 | 2.7 | 42.8 | 1.7 | 2.0 | 12.5 |
| 4 | 2.5 | 35.1 | 1.4 | 1.0 | 11.0 |
| 5 | 1.4 | 7.4 | 1.3 | 1.0 | 5.00 |
| 6 | 1.9 | 9.6 | 1.4 | 1.0 | 7.80 |

Figure 3A:
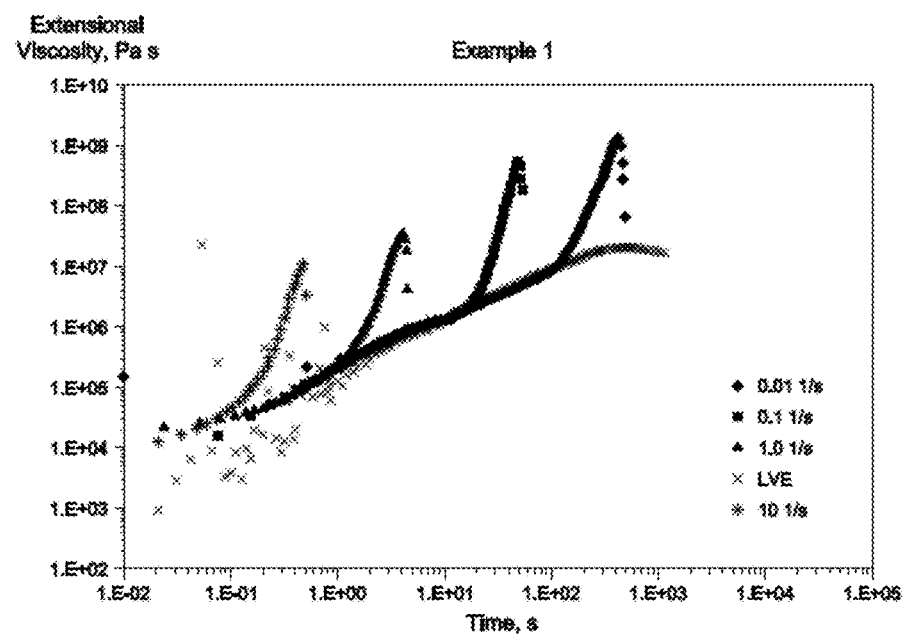
FIGS. 3a, 3b, and 3c are SER graphs of extensional viscosity measured at 150° C. as a function of time for a sample of polyethylene according to the invention and two comparative polyethylenes.
Figure 3B:
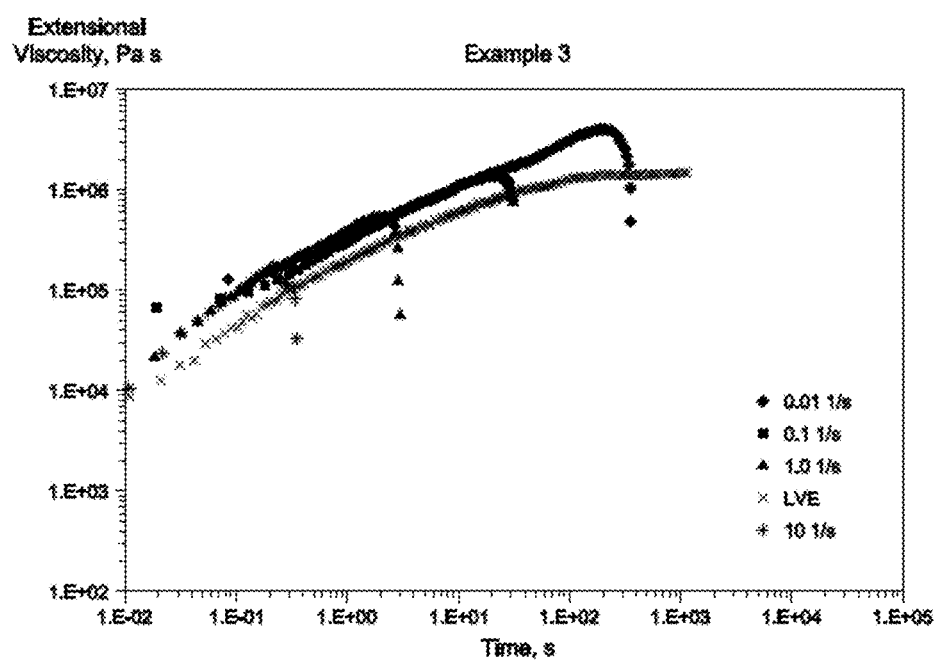
Figure 3C:
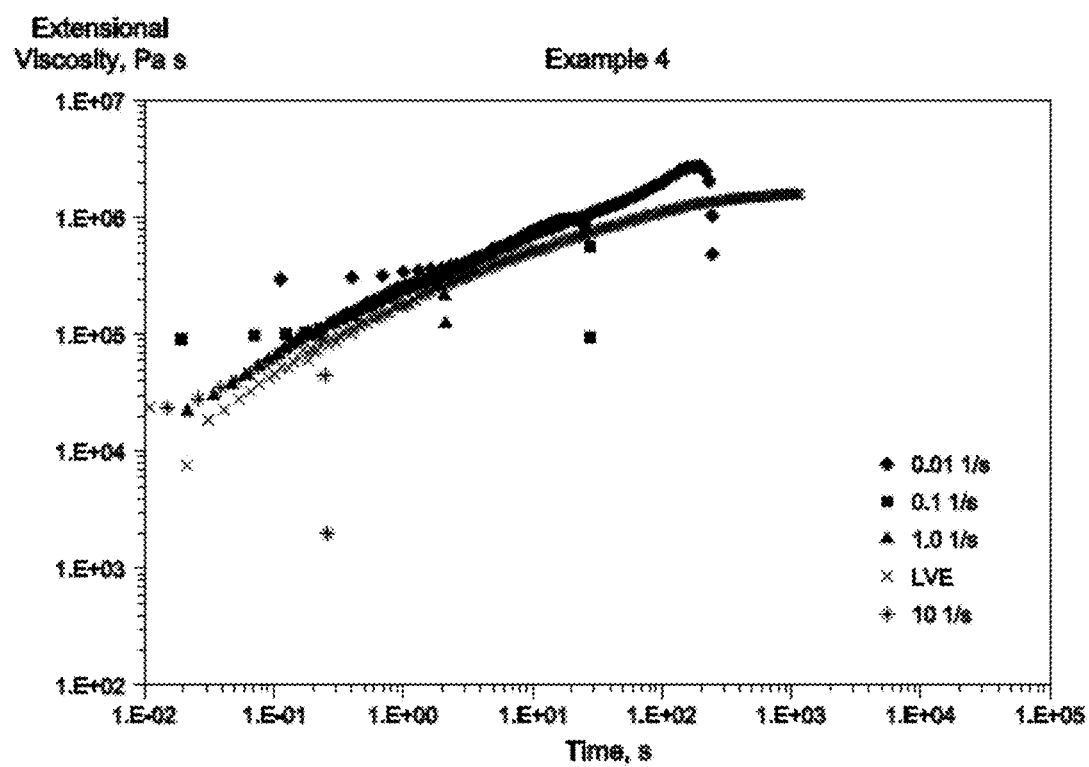

FIGS. 3a, 3b, and 3c are SER graphs of extensional viscosity measured at 150° C. as a function of time for the inventive polyethylene of Example 1 and the comparative polyethylenes of Examples 3 and 4, respectively. As shown, the inventive polyethylene demonstrates significantly higher SHR relative to the comparative examples, which is indicative of improved processability (e.g., enhanced bubble stability in the film blowing process with better film gauge uniformity and improved parison formation during blow molding).

Slow crack growth resistance, via both ESCR and NCLS, was also tested on the inventive and comparative polyethylenes, and results are summarized in Table 7 below. Where the results in Table 8 are listed as greater than a given number of hours, it is because the test was stopped after multiple samples reached that point without failure.

TABLE 7

Slow Crack Growth Resistance.

| Example | Density (g/cm³) | ESCR (hrs) @ 50% Failure (F50), 10% Igepal, 50° C., ASTM D1693 | NCLS (hrs), 10% Igepal, 50° C., 800 psi, ASTM F2136 |
|---|---|---|---|
| 1 | 0.950 | >4,901 | >1,930 |
| 2 | 0.950 | 5,062 | >809 |
| 3 | 0.962 | >5932 | >1,313 |
| 4 | 0.953 | >5400 | 294 |
| 5 | 0.950 | 693 | 81 |
| 6 | 0.945 | >5400 | 339 |

Crystallinity attributes of certain inventive and comparative polyethylenes were also analyzed via x-ray scattering, and results are summarized in Table 8 below. In Table 8, I(Lp1):I(Lp2) depicts the ratio of intensity of primary over secondary crystals (see also FIG. 4).

TABLE 8

Crystallinity Via X-ray Scattering.

| Example | % Crystallinity WAXS | SAXS Lp1 (Å) | SAXS Lp2 (Å) | I(Lp1):I(Lp2) |
|---|---|---|---|---|
| 1 | 55.5 | 216.89 | 113.83 | 39.7 |
| 5 | 53.8 | 245.53 | 134.11 | 33.2 |
| 6 | 51.6 | 238.18 | 128.70 | 45.8 |

Single Screw Extrusion Process

In addition to BP 18 twin screw extrusion, extruder processability was assessed for the inventive and comparative polyethylenes in pellet form with a HAAKE 252 Single Screw Extruder. The screw diameter was ¾ inch, the ratio of length over screw diameter (L/D) was 25:1, and the compression ratio was 3:1. A rod die was used with a diameter of 3 mm, and the cylindrical strand was passed through a water bath and then entered a strand-cut pelletizer (Berlyn model # PEL-2 manufactured by Clay Group Inc., Massachusetts, 20 volt/2.5 amps) to produce pellets for analysis and testing. The mass throughput was determined in lbs/hr by collecting and weighing pellets exiting the pelletizer over a period of time, typically 2 minutes. The specific energy input (SEI) was estimated using the following formula:

$$SEI = \frac{1}{4,331.488} * \frac{T*n}{W}$$

where SEI is the specific energy input in kw-hr/kg, T is the torque in N m, n is the screw rotation speed in rpm (rev/min), W is the mass throughput in lbs/hr, and 4,331.488 is a unit conversion factor. Extrusion conditions and results are summarized in Table 9 below. Melt temperature in Table 9 was measured in the bulk of the melt with an infrared sensor at a location between the end of the screw and the die.

TABLE 9

HAAKE Single Screw Extruder Conditions and Results.

| | Example 1 | Example 3 | Example 4 | Example 5 | Example 6 |
|---|---|---|---|---|---|
| Barrel Zone 1 Temperature (° C.) | 180 | 180 | 180 | 180 | 180 |
| Barrel Zone 2 Temperature (° C.) | 191 | 190 | 190 | 190 | 190 |
| Barrel Zone 3 Temperature (° C.) | 200 | 200 | 214 | 200 | 203 |
| Barrel Zone 4 Temperature (° C.) | 210 | 210 | 208 | 210 | 210 |
| Melt Temperature (° C.) | 164 | 164 | 178 | 169 | 169 |
| Torque (N m) | 43.3 | 47.1 | 42 | 45 | 53 |
| Screw speed (rpm) | 100 | 100 | 100 | 100 | 100 |
| Head pressure (PSI) | 1201 | 1237 | 1206 | 1240 | 1485 |
| Throughput (lbs/hr) | 4.36 | 5.15 | 5.4 | 5.28 | 4.69 |
| SEI (kw-hr/kg) | 0.229 | 0.211 | 0.180 | 0.197 | 0.261 |
| Die Pressure/ Throughput (psi-hr/lb) | 275.5 | 240.2 | 223.3 | 234.8 | 316.6 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law. Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa. Likewise, the terms "comprising," "consisting essentially of," "consisting of" also include the product of the combinations of elements listed after the term.

What is claimed is:

1. A multimodal ethylene polymer comprising a low molecular weight fraction, LMWF, having a molecular weight of less than 100 kg/mol and a high molecular weight fraction, HMWF, having a molecular weight of more than 700 kg/mol, the polymer having:
   a. at least 50 mol% ethylene;
   b. a density of 0.938 to 0.965 g/cm³ according to ASTM D1505;
   c. a medium load melt index, $I_5$, measured according to ASTM D1238(190° C., 5 kg weight), of 0.05 to 50 g/10 min;
   d. a flow index, $I_{21}$, measured according to ASTM D1238 (190° C., 21.6 kg weight), of 0.1 to 100 g/10 min;
   e. a ratio of Mz/Mw of greater than 5.5;
   f. at least two inflection points in a GPC-4D trace; and
   g. a strain hardening ratio, SHR, via SER of greater than 10 at a Hencky strain rate of 0.1 s$^{-1}$ and/or 1 s$^{-1}$.

2. The polymer of claim 1 comprising from 0.1 to 50 wt% of the HMWF.

3. The polymer of claim 1 having a molecular weight distribution, Mw/Mn, of from 18 to 50.

4. The polymer of claim 1 having a melt strength via RHEOTENS at a 190° C. die temperature of greater than 22 cN.

5. The polymer of claim 1 having a melt index, $I_2$ measured according to ASTM D1238(190° C., 2.16 kg weight), of 0.01 to 10 g/10 min.

6. The polymer of claim 1 having at least three inflection points in a GPC-4D trace.

7. A process to produce the polymer of claim 1, wherein the polymer is produced using a supported catalyst system comprising:
   (i) at least one first catalyst component comprising a pyridyldiamido transition metal complex;
   (ii) at least one second catalyst component comprising a metallocene compound;
   (iii) a support material; and
   (iv) optionally, an activator.

8. The process of claim 7, wherein the pyridyldiamido transition metal complex has the general formula (I):

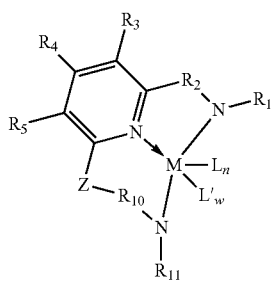

(I)

wherein,

M is Ti, Zr, or Hf;

Z is —$(R_{14})_pC$—$C(R_{15})_q$—,
   where $R_{14}$ and $R_{15}$ are independently selected from the group consisting of hydrogen, hydrocarbyls, and substituted hydrocarbyls, and wherein adjacent $R_{14}$ and $R_{15}$ groups may be joined to form an aromatic or saturated, substituted or unsubstituted hydrocarbyl ring, where the ring has 5, 6, 7, or 8 ring carbon atoms and where substitutions on the ring can join to form additional rings, p is 0, 1 or 2, and q is 0, 1 or 2;

$R_1$ and $R_{11}$ are independently selected from the group consisting of hydrocarbyls, substituted hydrocarbyls, and silyl groups;

$R_2$ and $R_{10}$ are each, independently, —$E(R_{12})(R_{13})$— with E being carbon, silicon, or germanium, and each $R_{12}$ and $R_{13}$ being independently selected from the group consisting of hydrogen, hydrocarbyls, alkoxy, silyl, amino, aryloxy, substituted hydrocarbyls, halogen, and phosphino, $R_{12}$ and $R_{13}$ may be joined to each other or to $R_{14}$ or $R_{15}$ to form a saturated, substituted or unsubstituted hydrocarbyl ring, where the ring has 4, 5, 6, or 7 ring carbon atoms and where substitutions on the ring can join to form additional rings, or $R_{12}$ and $R_{13}$ may be joined to form a saturated heterocyclic ring, or a saturated substituted heterocyclic ring where substitutions on the ring can join to form additional rings;

$R_3$, $R_4$, and $R_5$ are independently selected from the group consisting of hydrogen, hydrocarbyls (such as alkyls and aryls), substituted hydrocarbyls, alkoxy, aryloxy, halogen, amino, and silyl, and wherein adjacent R groups ($R_3$ & $R_4$, and/or $R_4$ & $R_5$) may be joined to form a substituted or unsubstituted hydrocarbyl or heterocyclic ring, where the ring has 5, 6, 7, or 8 ring atoms and where substitutions on the ring can join to form additional rings;

L is an anionic leaving group, where the L groups may be the same or different and any two L groups may be linked to form a dianionic leaving group;

n is 0, 1, 2, 3, or 4;

L' is neutral Lewis base; and w is 0, 1, 2, 3 or 4.

9. The process of claim 7, wherein the metallocene compound is represented by the formula $Cp^ACp^BM'X'_n$, wherein $Cp^A$ and $Cp^B$ are each independently selected from the group consisting of cyclopentadienyl ligands and ligands isolobal to cyclopentadienyl, either or both $Cp^A$ and $Cp^B$ optionally contain heteroatoms, and either or both $Cp^A$ and $Cp^B$ optionally are substituted; wherein M' is Ti, Zr, or Hf; wherein X' may be any leaving group; wherein n is 0, 1, 2, 3, or 4.

10. The process of claim 7, wherein the polymer is produced in situ in a single reactor and the single reactor is a single gas phase reactor.

* * * * *